US011629800B2

(12) United States Patent
Yamamoto et al.

(10) Patent No.: US 11,629,800 B2
(45) Date of Patent: Apr. 18, 2023

(54) DOUBLE PIPE AND METHOD FOR MANUFACTURING SAME

(71) Applicant: YUTAKA GIKEN CO., LTD., Hamamatsu (JP)

(72) Inventors: Koji Yamamoto, Hamamatsu (JP); Takashi Wagatsuma, Hamamatsu (JP); Ryoji Noda, Hamamatsu (JP)

(73) Assignee: YUTAKA GIKEN CO., LTD., Hamamatsu (JP)

( * ) Notice: Subject to any disclaimer, the term of this patent is extended or adjusted under 35 U.S.C. 154(b) by 0 days.

(21) Appl. No.: 17/381,473

(22) Filed: Jul. 21, 2021

(65) Prior Publication Data

US 2022/0057023 A1 Feb. 24, 2022

(30) Foreign Application Priority Data

Aug. 21, 2020 (JP) .............................. JP2020-139871
Dec. 28, 2020 (JP) .............................. JP2020-219379

(51) Int. Cl.
*F16L 9/18* (2006.01)
*F16L 9/00* (2006.01)

(52) U.S. Cl.
CPC ............... *F16L 9/18* (2013.01); *F16L 9/003* (2013.01)

(58) Field of Classification Search
CPC ....... F16L 7/00; F16L 9/18; F28D 7/10; F28F 1/06; F28F 1/10
USPC ......................................... 138/112–114, 148
See application file for complete search history.

(56) References Cited

U.S. PATENT DOCUMENTS

| | | | | | |
|---|---|---|---|---|---|
| 4,372,374 | A | * | 2/1983 | Lee | F28D 7/103 165/70 |
| 4,451,966 | A | * | 6/1984 | Lee | F28D 7/106 29/890.036 |
| 4,585,059 | A | * | 4/1986 | Lee | F28D 7/106 285/123.1 |
| 6,062,265 | A | * | 5/2000 | Head | H02G 9/06 138/113 |
| 6,155,378 | A | * | 12/2000 | Qatu | F02M 55/04 181/255 |

(Continued)

FOREIGN PATENT DOCUMENTS

| | | |
|---|---|---|
| JP | 46-017381 Y | 6/1971 |
| JP | 58-122886 U | 8/1983 |
| JP | 6029686 | 11/2016 |

OTHER PUBLICATIONS

Japanese Office Action dated Jan. 17, 2023, Japanese Patent Application No. 2020-219379, English test, 5 pages.

*Primary Examiner* — Patrick F Brinson
(74) *Attorney, Agent, or Firm* — Rankin, Hill & Clark LLP

(57) ABSTRACT

A double pipe includes an outer pipe in which an inner pipe is placed, and a spacer that maintains a clearance between the inner pipe and the outer pipe. At least a part of the spacer is press-fitted by an inner circumferential surface of the outer pipe and an outer circumferential surface of the inner pipe. More specifically, the outer pipe includes a diameter-reduced portion having undergone diameter reduction by plasticity processing. An inner circumferential surface of the diameter-reduced portion is present across the entire circumference other than the opening of the spacer, and presses an outer circumferential surface of the spacer inwardly in the radial direction.

16 Claims, 17 Drawing Sheets

(56) References Cited

U.S. PATENT DOCUMENTS

| | | | | |
|---|---|---|---|---|
| 6,478,053 B2 * | 11/2002 | Zanardi | ............... | F16L 55/0331 181/255 |
| 2005/0051310 A1 * | 3/2005 | Inoue | ........................ | F28F 1/06 165/70 |
| 2017/0356590 A1 * | 12/2017 | Jackson | .................... | F16L 7/00 |

* cited by examiner

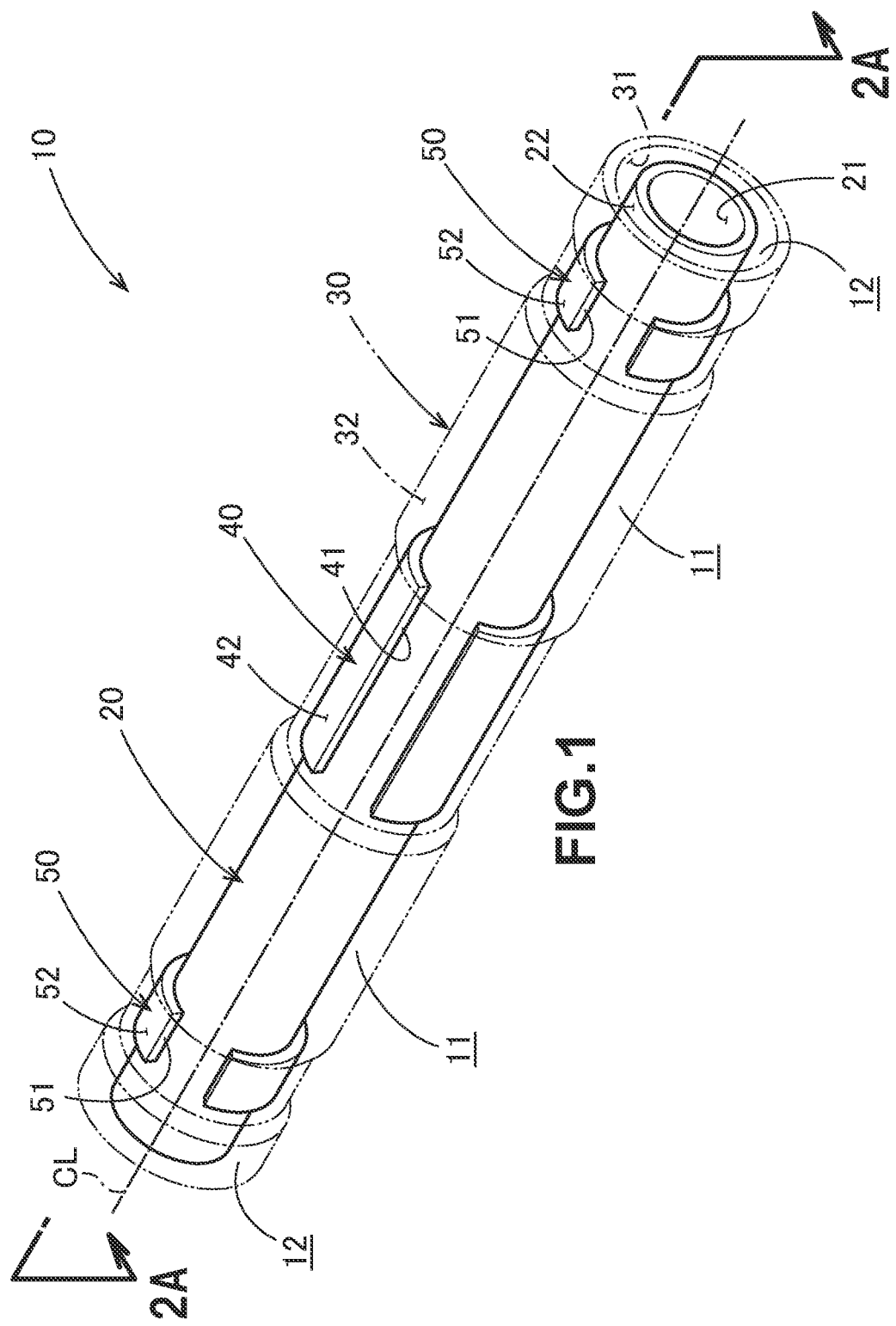

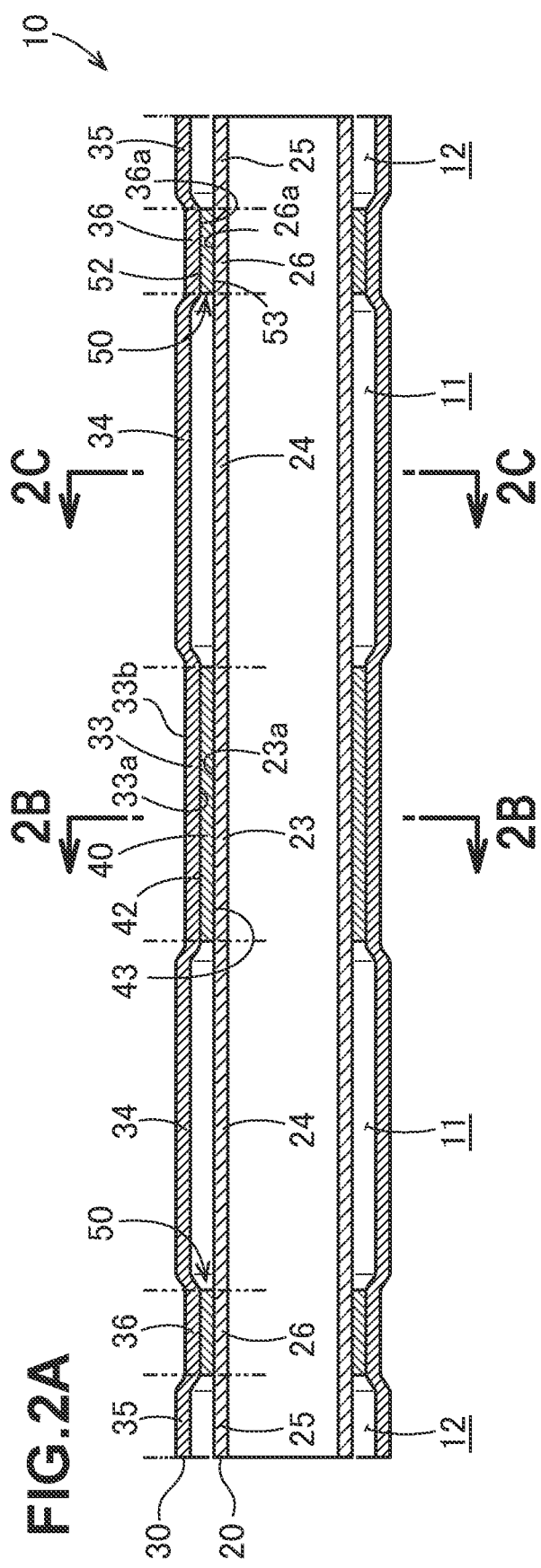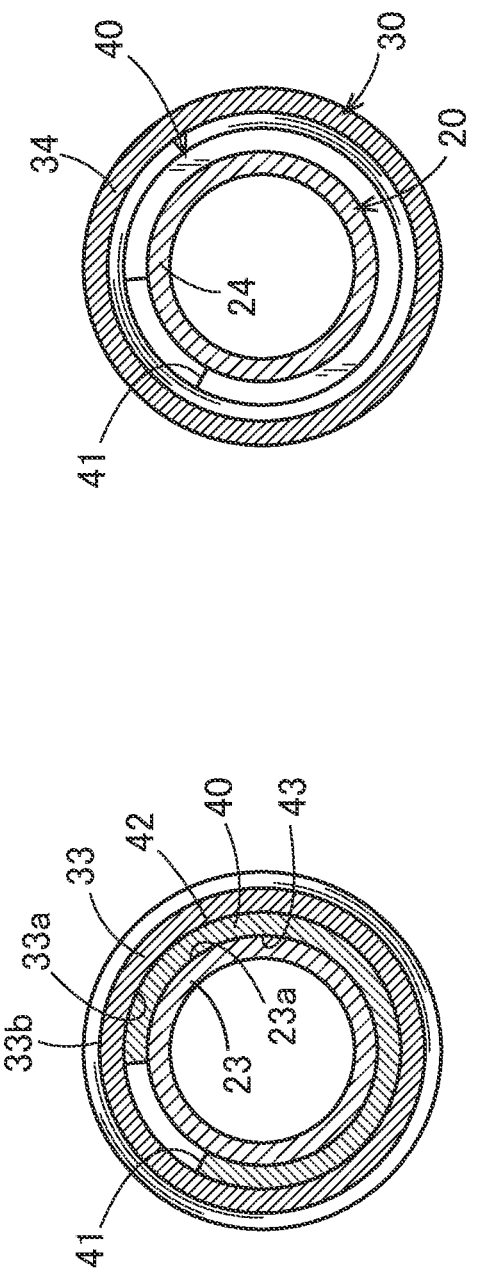

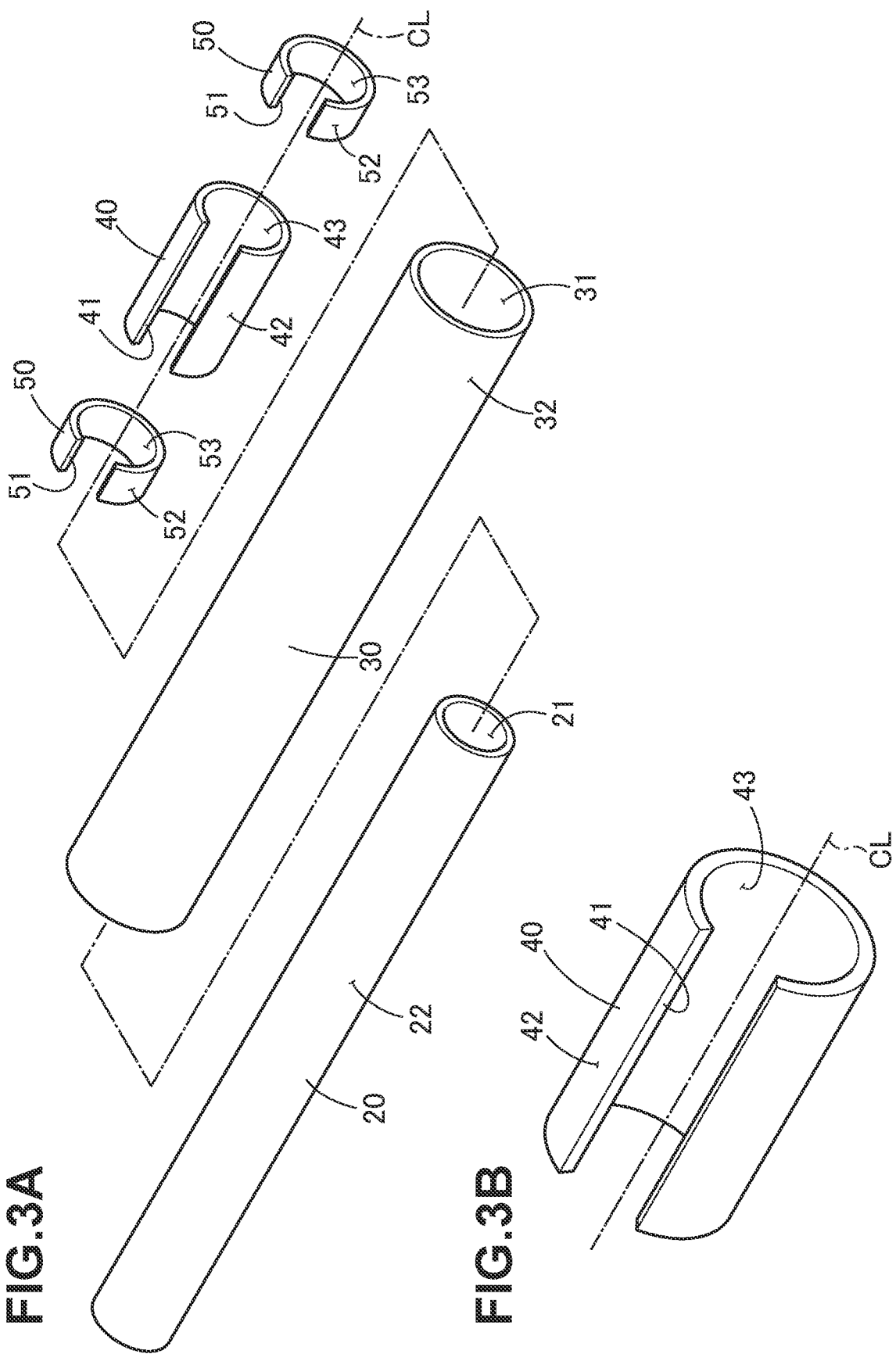

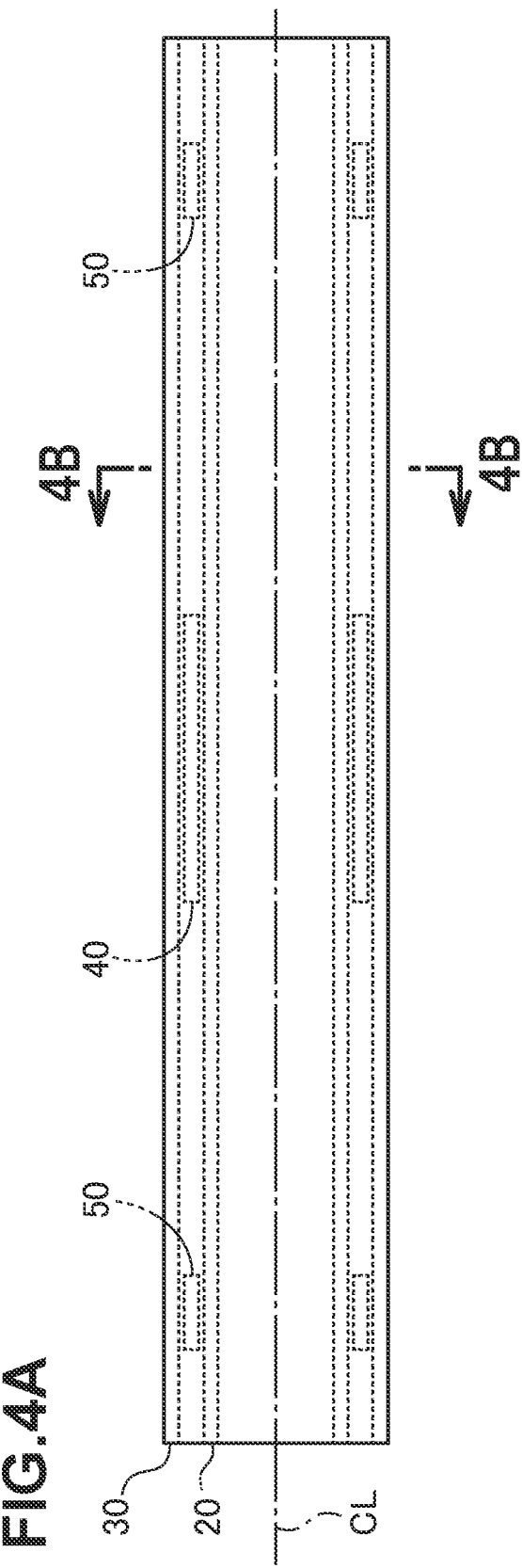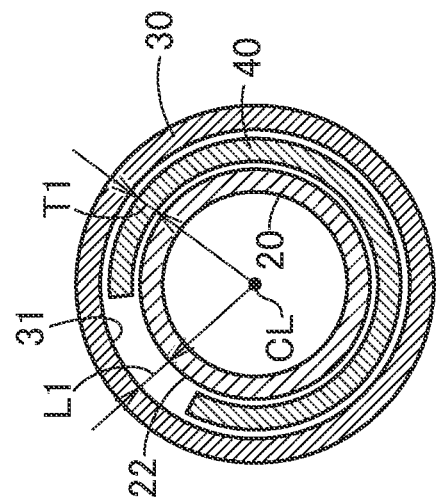

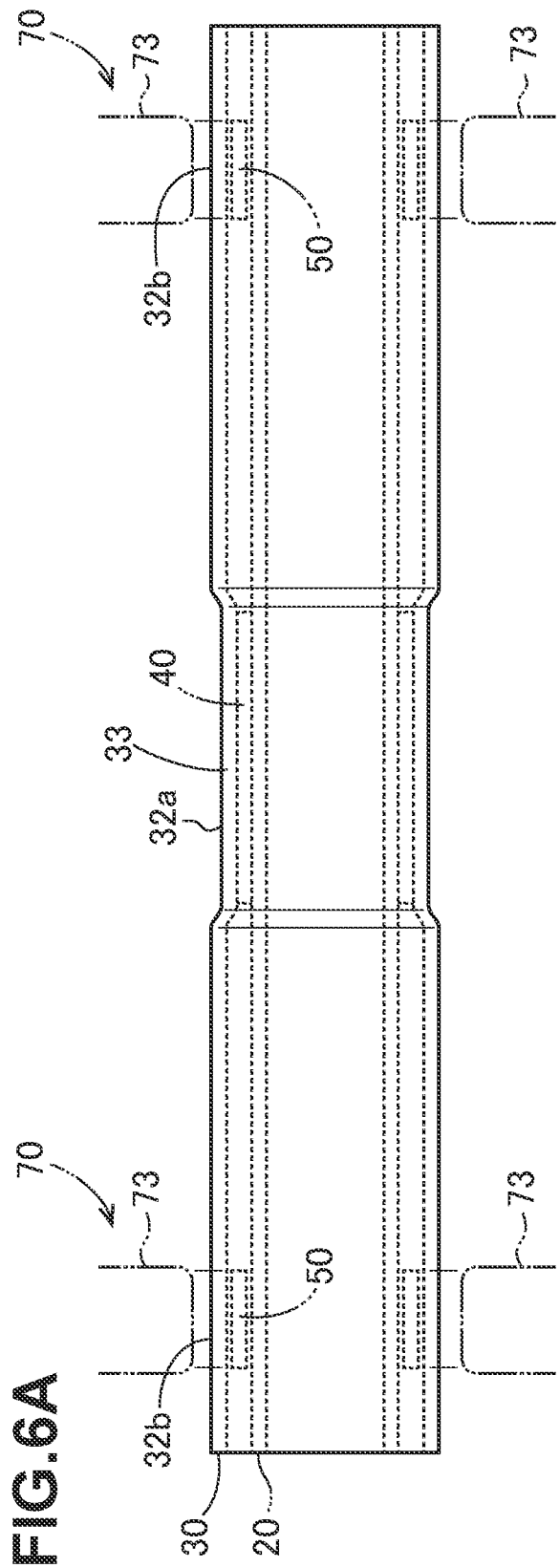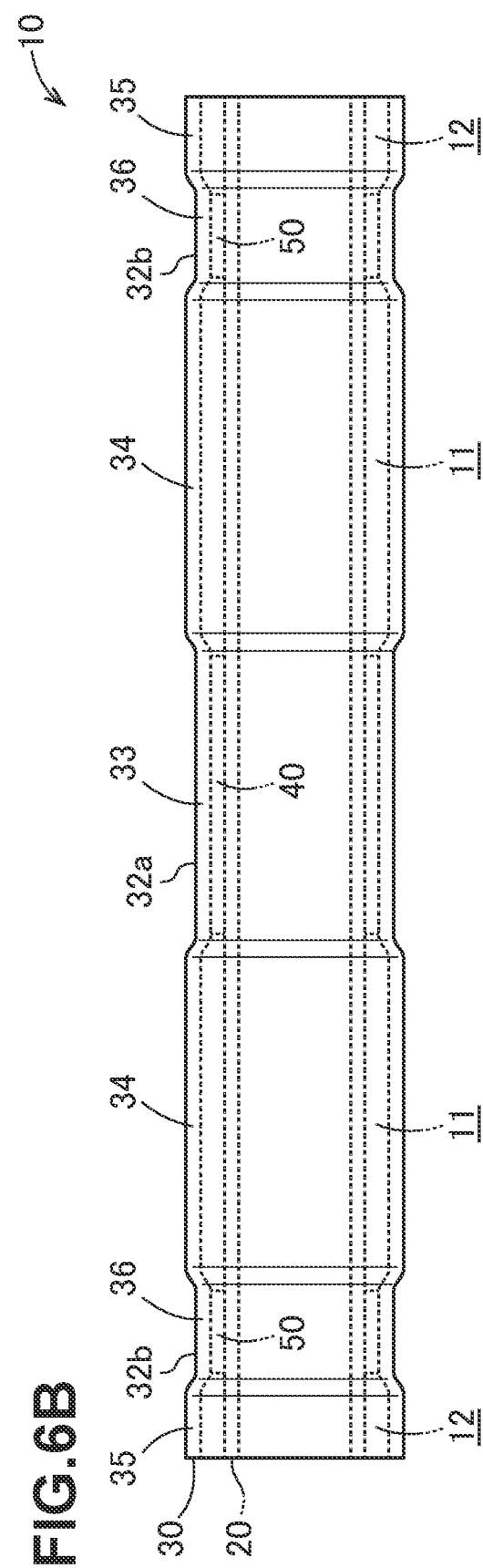

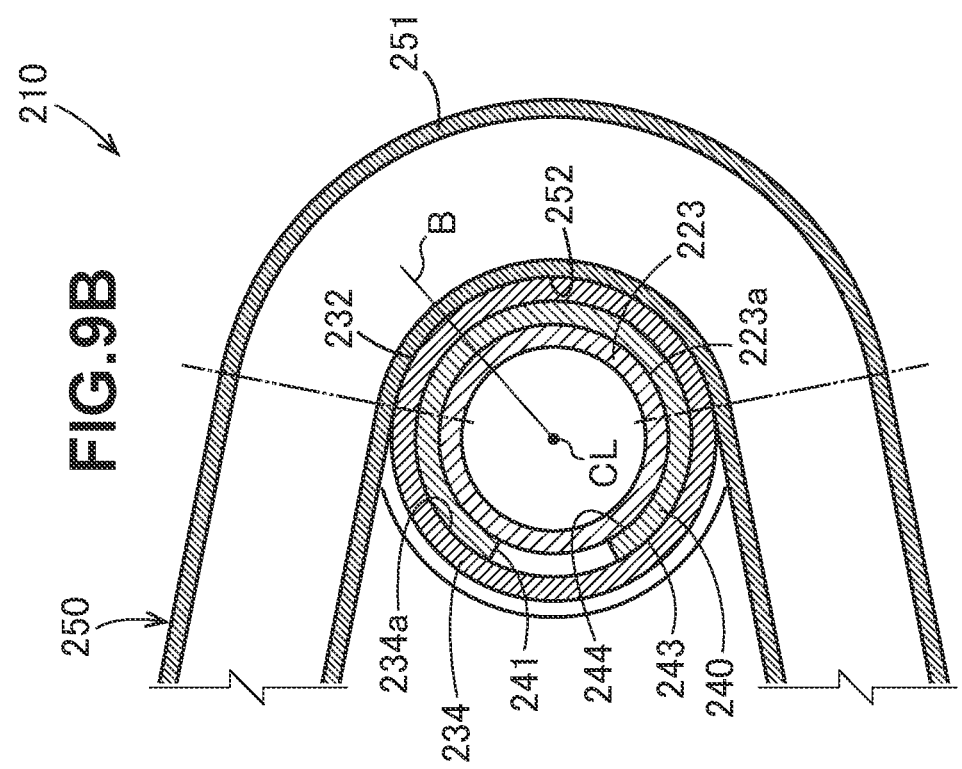
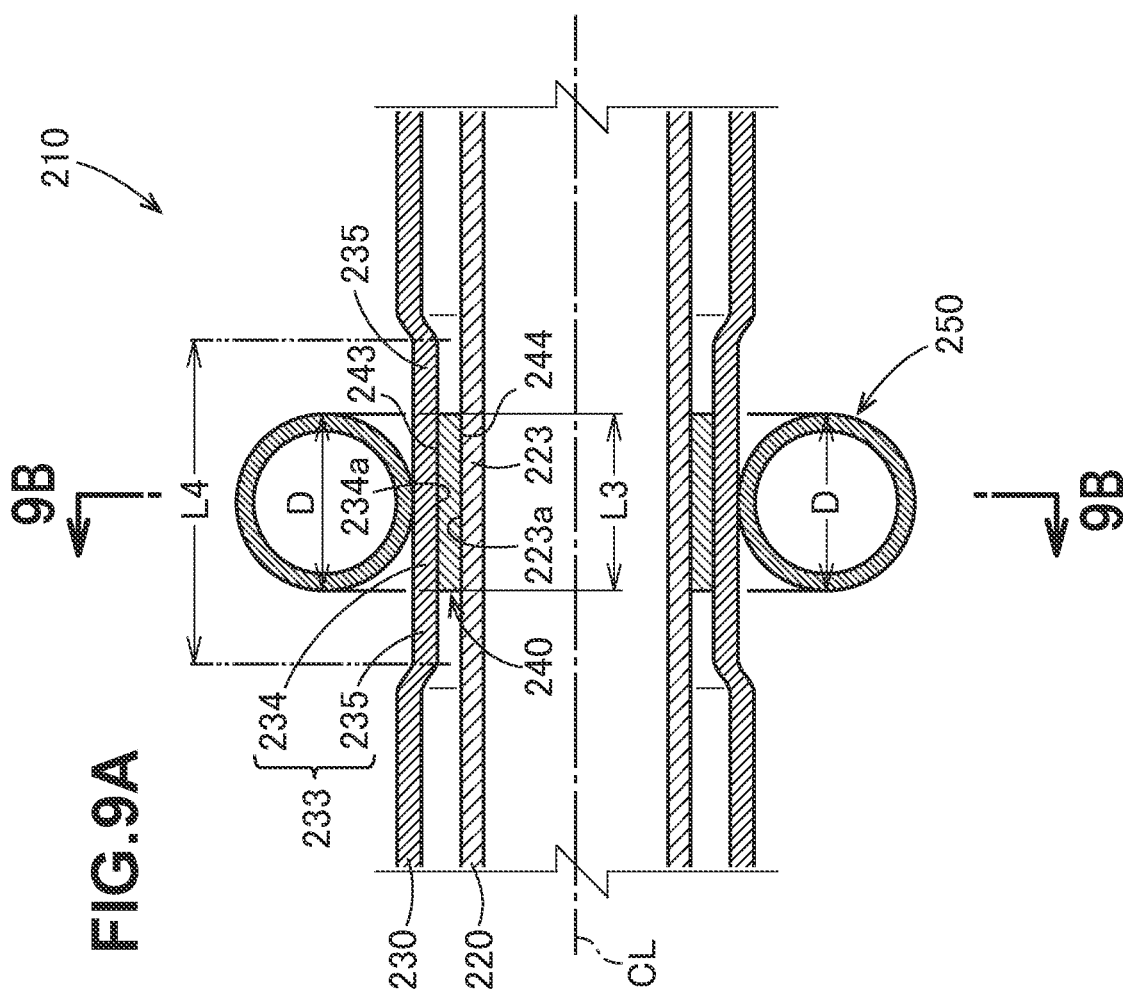

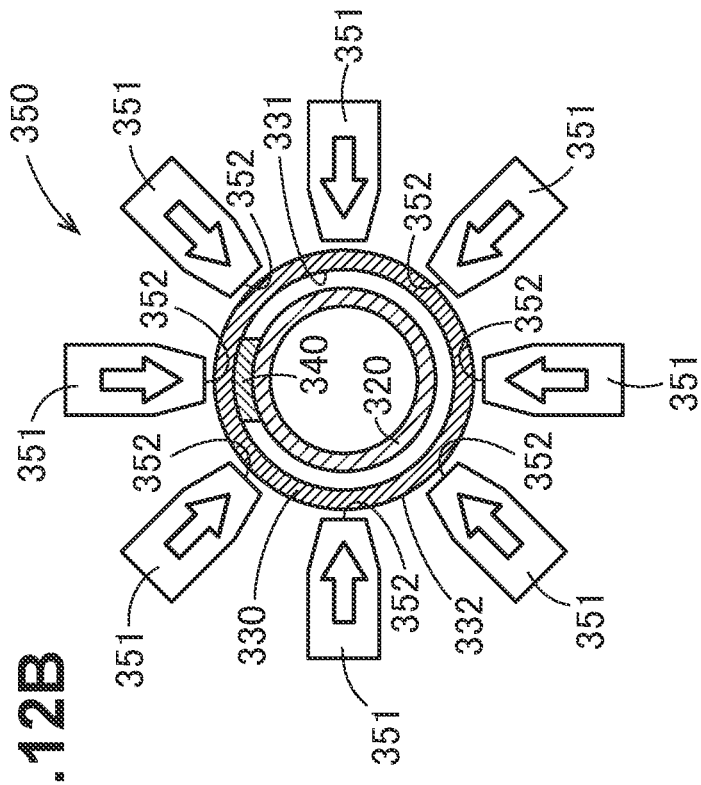
FIG.12B
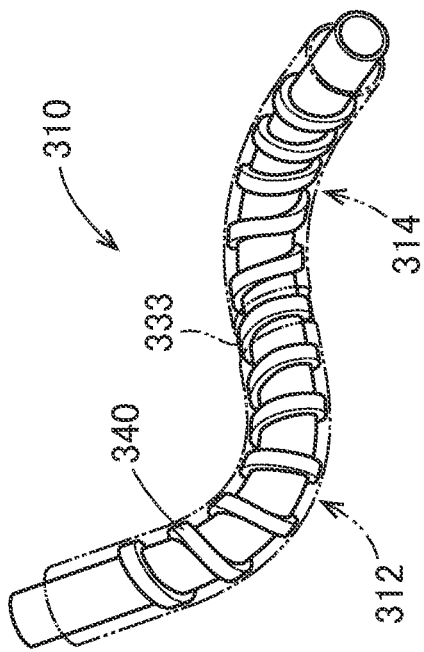
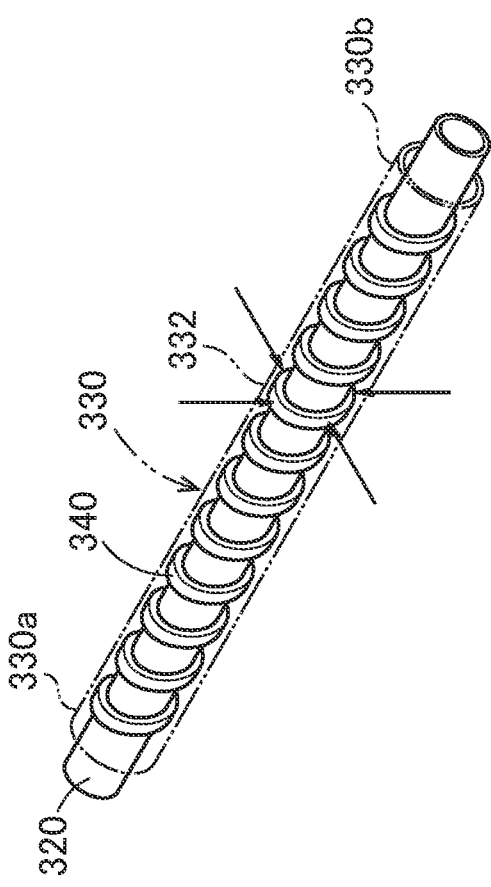
FIG.12A
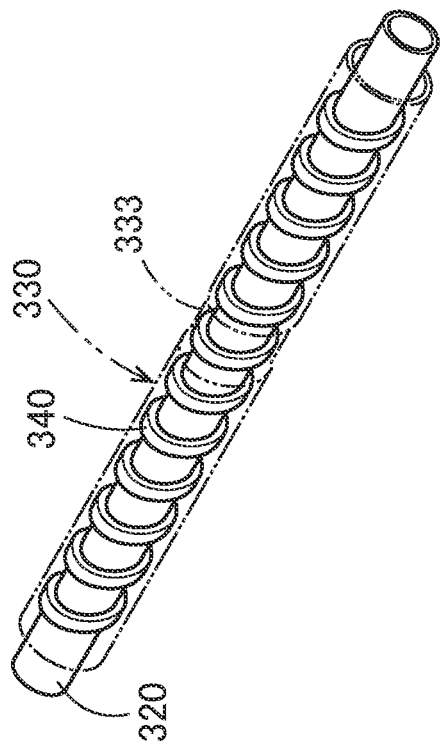
FIG.12C

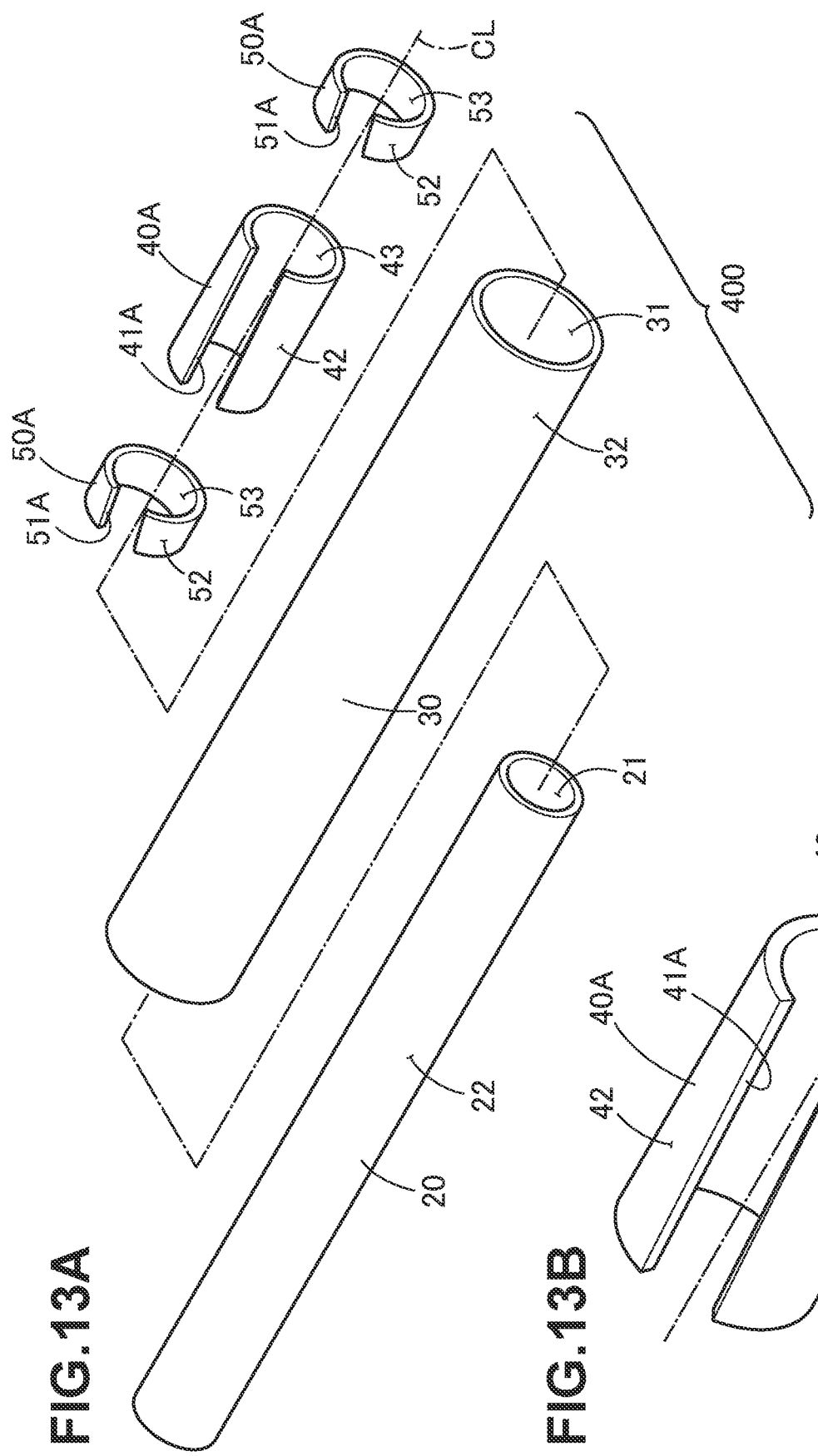

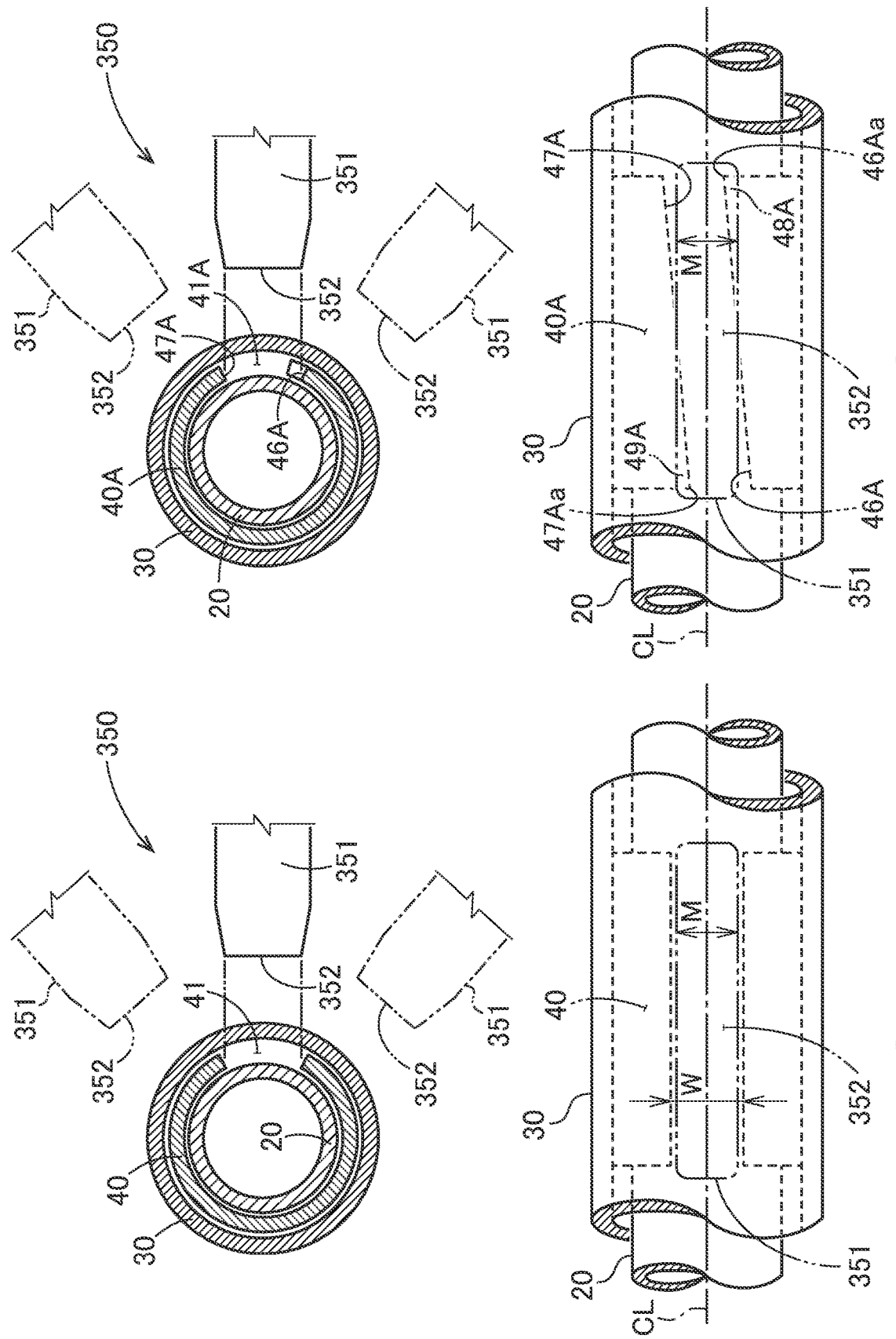

DOUBLE PIPE AND METHOD FOR MANUFACTURING SAME

FIELD OF THE INVENTION

The present disclosure relates to a double pipe provided with a spacer, and a method for manufacturing same.

BACKGROUND

Some double pipes each including an inner pipe and an outer pipe have a spacer between the inner pipe and the outer pipe. Japan Patent No. 6029686 B discloses a conventional technology relating to such a double pipe provided with a spacer.

FIG. 17 is FIG. 2 of Japan Patent No. 6029686 B but new reference numerals are given. A double pipe 900 is a heat exchanger that exchanges heat between a first fluid that flows through an interior 921 of an inner pipe 920, and a second fluid that flows through an annular space 931 between the inner pipe 920 and the outer pipe 930.

A cylindrical spacer 940 is provided between the inner pipe 920 and the outer pipe 930. Convex portions 941 that protrude outwardly in the radial direction, and concavity portions 942 recessed inwardly in the radial direction are alternately arranged in the circumferential direction of the cylindrical spacer 940.

Since the spacer 940 has the convex portions 941 and the concavity portions 942, the length in the circumferential direction increases. Since the area that can contact the second fluid increases relative to the spacer 940, the heat exchanging efficiency increases.

In order to join the inner pipe 920 and the outer pipe 930, and, the spacer 940, Japan Patent No. 6029686 B discloses blazing of the respective contact surfaces. For example, after assembling the spacer 940 to the outer pipe 930 and to the inner pipe 920, a blazing material is applied to the contact surfaces, and the blazing material is melted by furnace blazing, etc., to join the contact surfaces with each other.

In order to improve the joining precision, it is desirable that the gap between the contact surfaces should be quite small. More specifically, a design and a manufacturing which cause the convex portions 941 of the spacer 940 to abut an inner circumferential surface 932 of the outer pipe 930, and cause the concave portions 942 of the spacer 940 to abut an outer circumferential surface 922 of the inner pipe 920 at the time of assembling are required. When an attempt to accomplish a high dimensional precision for each component is made, the manufacturing costs increase.

An objective is to provide a technology for manufacturing a double pipe provided with a spacer while suppressing manufacturing costs.

SUMMARY OF THE INVENTION

According to the present disclosure, a double pipe is provided which includes:
an outer pipe in which an inner pipe is placed; and
a spacer that maintains a clearance between the inner pipe and the outer pipe,
in which at least a part of the spacer is press-fitted by an inner circumferential surface of the outer pipe and by an outer circumferential surface of the inner pipe.

That is, the inner pipe and the spacer are placed in the outer pipe, and then by applying external force to the spacer in the radial direction, the spacer is fastened in the double pipe. Accordingly, a design such that when the inner pipe and the spacer are placed relative to the outer pipe, the spacer abuts the outer circumferential surface of the inner pipe, and also abuts the inner circumferential surface of the outer pipe is unnecessary.

Preferably, the above-described double pipe may further include a pipe through which a fluid is capable of flowing, and the pipe may include an abutting surface that abuts an outer circumferential surface of the outer pipe. Hence, when a heated fluid is caused to flow through the pipe, the inner pipe can be heated by heat transfer.

Preferably, the abutting surface of the pipe may be located, in a lengthwise direction of the outer pipe, outwardly in a radial direction relative to the spacer. Since the pipe is located near the spacer, the heat transfer efficiency to the inner pipe through the spacer is improved.

Preferably, the abutting surface of the pipe may be located, in the lengthwise direction of the outer pipe, outwardly in the radial direction relative to the press-fitted portion of the spacer. Accordingly, the heat transfer efficiency to the inner pipe through the spacer is further improved.

Preferably, the spacer may be formed in a substantially cylindrical shape as a whole, and may have a slit-shape opening so as to be in a C-shape as viewed in a direction along a center line of the double pipe. The opening becomes a communication passage that causes the adjoining annular spaces to each other via the spacer to be in communication with each other. Hence, the clearance between the inner pipe and the outer pipe becomes a flow passage through which a fluid can flow.

Preferably, the opening of the spacer may be inclined relative to the center line of the double pipe. Hence, when press-fitting is performed using a plurality of dies split in the circumferential direction, the die and the portion of the spacer near the opening are likely to overlap with each other in the radial direction of the double pipe. This stabilizes the shape of the inner circumferential surface of the double pipe and that of the outer circumferential surface thereof after press-fitting.

Preferably, when a straight line that passes through the center line of the double pipe and the abutting surface of the pipe as viewed in the direction along the center line of the double pipe is defined as a reference line, a part of the spacer may overlap the reference line. Accordingly, the heat transfer efficiency to the inner pipe through the spacer is improved.

Preferably, the double pipe may include a bent portion that is at least a part of the double pipe itself, and the spacer placed at the bent portion may be formed in a spiral shape wound around the outer circumferential surface of the inner pipe in the bent portion. The spacer in the spiral shape deforms in such a way that the adjoining portions become close to each other when bent. This facilitates bending in a bending step.

Preferably, a cross section of the spacer may be formed in a rectangular shape as viewed in a winding direction of the spacer. In comparison with a spacer that has a circular cross section, a contact area to the inner circumferential surface of the outer pipe and to the outer circumferential surface of the inner pipe increases. Forces produced at portions contacting with each other in a press-fitting step are distributed, suppressing a deformation of the inner pipe and of the outer pipe.

According to the present disclosure, a method for manufacturing a double pipe is provided, and the method includes:

a preparing step of preparing an inner pipe, an outer pipe in which the inner pipe is capable of being placed, and a spacer that maintains a clearance between the inner pipe and the outer pipe;

a placing step of placing the inner pipe and the spacer in the outer pipe; and a press-fitting step of causing at least a part of the spacer to be press-fitted by an inner circumferential surface of the outer pipe and an outer circumferential surface of the inner pipe by plastic deformation so as to reduce a diameter of a part of the outer pipe or by plastic deformation so as to increase a diameter of a part of the inner pipe.

Hence, a design such that, in a placing step, the spacer abuts the outer circumferential surface of the inner pipe, and also abuts the inner circumferential surface of the outer pipe is unnecessary. Since a high dimensional precision is not required, the manufacturing costs of the double pipe can be suppressed.

Preferably, the spacer may be formed in a substantially cylindrical shape as a whole, and may have a slit-shape opening so as to be in a C-shape as viewed in a direction along a center line of the double pipe, the opening of the spacer may be inclined relative to the center line of the double pipe, and in the press-fitting step, a plurality of dies split in a circumferential direction is applied. Accordingly, the die and the portion of the spacer near the opening are likely to overlap with each other in the radial direction of the double pipe. This stabilizes the shape of the inner circumferential surface of the double pipe and that off the outer circumferential surface thereof after press-fitting.

Preferably, a width of the opening of the spacer may be smaller than the width of the die. Accordingly, the die and the portion of the spacer near the opening surely overlap with each other in the radial direction of the double pipe. This stabilizes the shape of the inner circumferential surface of the double pipe and that off the outer circumferential surface thereof after press-fitting.

BRIEF DESCRIPTION OF THE DRAWINGS

FIG. 1 is a perspective view of a double pipe according to a first embodiment;

FIG. 2A is a cross-sectional view taken along a line 2A-2A in FIG. 1, FIG. 2B is a cross-sectional view taken along a line 2B-2B in FIG. 2A, and FIG. 2C is a cross-sectional view taken along a line 2C-2C in FIG. 2A;

FIG. 3A is a diagram illustrating a preparing step of a method for manufacturing the double pipe illustrated in FIG. 1, and FIG. 3B is a diagram illustrating a spacer illustrated in FIG. 3A in an enlarged manner;

FIG. 4A is a diagram illustrating a placing step of the method for manufacturing the double pipe illustrated in FIG. 1, and FIG. 4B is a cross-sectional view taken along a line 4B-4B in FIG. 4A;

FIG. 6A is a diagram for describing how to press-fit the spacer placed at an end of the double pipe, and FIG. 6B is a diagram for describing the double pipe obtained through the press-fitting step;

FIG. 9A is a cross-sectional view of a double pipe according to a third embodiment, and FIG. 9B is a cross-sectional view taken along a line 9B-9B in FIG. 9A;

FIG. 12A is a diagram illustrating a press-fitting step of the method for manufacturing the double pipe illustrated in FIG. 10A, FIG. 12B is a diagram for describing press-fit by a split die in the press-fitting step in FIG. 12A, and FIG. 12C is a diagram illustrating a bending step of the method for manufacturing the double pipe illustrated in FIG. 10A;

FIG. 13A is a perspective view of a component of a double pipe according to a fifth embodiment, and FIG. 13B is a perspective view of a spacer according to the fifth embodiment;

FIG. 15A is a diagram for describing the method for manufacturing the double pipe according to the first embodiment, and FIG. 15B is a diagram for describing a method for manufacturing the double pipe according to the fifth embodiment;

DETAILED DESCRIPTION OF THE EMBODIMENTS

Figure 5A:
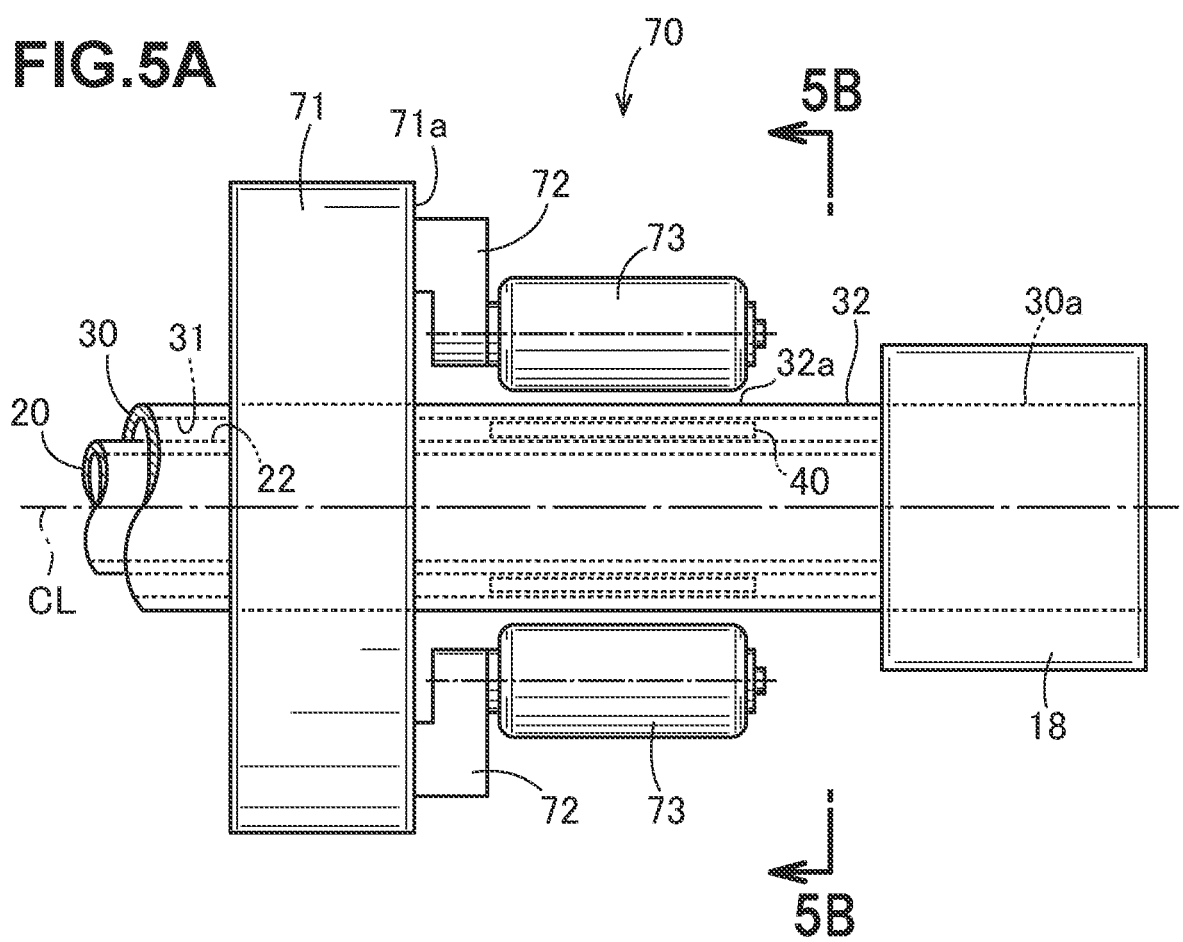
FIG. 5A is a diagram illustrating a press-fitting step of the method for manufacturing the double pipe illustrated in FIG. 1.

Embodiments of the present disclosure will be described below with reference to the accompanying drawings. Note that a center line is the center of a double pipe, and is also a center of a component of the double pipe.

First Embodiment

FIG. 1 illustrates a double pipe 10 that includes an inner pipe 20, an outer pipe 30 in which the inner pipe 20 is placed, and three spacers 40, 50 and 50 which are provided between the inner pipe 20 and the outer pipe 30, and which maintain the clearance between the inner pipe 20 and the outer pipe 30. A first fluid can flow through a space surrounded by an inner circumferential surface 21 of the inner pipe 20.

Among the three spacers 40, 50 and 50, the one placed at the center of the double pipe 10 in the lengthwise direction will be referred to as a first spacer 40, and the remaining two placed at respective ends will be referred to as second spacers 50 and 50. Note that the number of spacers and the placement locations can be changed as appropriate.

In the clearance between the inner pipe 20 and the outer pipe 30, the locations where any of the spacers 40, 50 and 50 are not provided become annular spaces. First annular spaces 11 and 11 are formed between the first spacer 40 and the respective second spacers 50. Second annular spaces 12 and 12 are formed at the external side (a direction becoming apart from the center of the double pipe 10 in the lengthwise direction) relative to the second spacer 50.

The spacers 40, 50 and 50 are press-fitted by an inner circumferential surface 31 of the outer pipe 30 and an outer circumferential surface 22 of the inner pipe 20. Note that, as for the spacers 40, 50 and 50, it is adequate that at least a part is press-fitted (i.e., there may be a part not press-fitted in the circumferential direction).

With reference to FIG. 2A to FIG. 2C, the outer pipe 30 includes three diameter-reduced portions 33, 36 and 36 having the respective diameters reduced by plasticity processing, and general portions 34, 34, 35 and 35 each adjoining to any of the diameter-reduced portions 33, 36 and 36, and not having undergone the diameter reduction.

Press-fitting of the first spacer 40 will be described. Among the diameter-reduced portions 33, 36 and 36, the one located at the outer-circumference side of the first spacer 40 will be referred to as a first diameter-reduced portion 33. An inner circumferential surface 33a of the first diameter-reduced portion 33 is present across the entire circumference other than an opening 41 of the first spacer 40, and presses an outer circumferential surface 42 of the first spacer 40 to the internal side in the radial direction.

The inner pipe 20 includes a first support portion 23 that supports the first spacer 40 pressed by the first diameter-reduced portion 33. An outer circumferential surface 23a of the first support portion 23 abuts an inner circumferential surface 43 of the first spacer 40, and compresses the first spacer 40 in the radial direction together with the first diameter-reduced portion 33.

Each second spacer 50 is also press-fitted by the same structure. Press-fitting of the one second spacer 50 (at the right side in FIG. 2A) will be described. The same is true for the other second spacer 50 (at the left side in FIG. 2A).

Among the diameter-reduced portions 33, 36 and 36, the one located at the outer circumferential side of the second spacer 50 will be referred to as a second diameter-reduced portion 36. An inner circumferential surface 36a of the second diameter-reduced portion 36 is present across the entire circumference other than an opening 51 of the second spacer 50 (see FIG. 1 and FIG. 3), and presses an outer circumferential surface 52 of the second spacer 50 inwardly in the radial direction.

The inner pipe 20 includes a second support portion 26 that supports the second spacer 50 pressed by the second diameter-reduced portion 36. An outer circumferential surface 26a of the second support portion 26 abuts an inner circumferential surface 53 of the second spacer 50, and compresses the second spacer 50 in the radial direction together with the second diameter-reduced portion 36.

Among the general portions 34, 34, 35 and 35 of the outer pipe 30, the ones at the respective outer circumferential sides of the first spaces 11 and 11 will be referred to as first general portions 34 and 34, and the ones at the respective outer circumferential sides of the second spaces 12 and 12 will be referred to as second general portions 35 and 35.

In the inner pipe 20, the inner circumferential side of the first space 11 will be referred to as a first inner wall portion 24, and the inner circumferential side of the second space 12 will be referred to as a second inner wall portion 25.

Next, a method for manufacturing the double pipe 10 will be described.

With reference to FIG. 3A, first, the cylindrical inner pipe 20 that extends straightly, the cylindrical outer pipe 30 which has a larger diameter than that of the inner pipe 20 and which extends straightly, the first spacer 40 and the two second spacers 50 and 50 that maintain the clearance between the inner pipe 20 and the outer pipe 30 are prepared (a preparing step).

With reference to FIG. 3B, the first spacer 40 is formed in a substantially cylindrical shape as a whole, and is formed in a C-shape as viewed in the direction along a center line CL. That is, the first spacer 40 has the opening 41 formed along the center line CL.

Similarly, the second spacer 50 is formed in a substantially cylindrical shape as a whole, and is formed in a C-shape as viewed in the direction along the center line CL. That is, the second spacer 50 has the opening 51 formed along the center line CL. In the direction of the center line CL, the second spacer 50 is shorter than the first spacer 40. In the direction of the center line CL, the respective dimensions of the spacers 40 and 50 can be changed as appropriate.

With reference to FIG. 4A, next, the inner pipe 20 and the first spacer 40 are placed at the center relative to the outer pipe 30, and the second spacers 50 and 50 are placed at the respective ends (a placing step). For example, the first spacer 40 and second spacers 50 are attached to the inner pipe 20, and the inner pipe 20 to which the spacers 40 and 50 are attached is inserted in the outer pipe 30, but the placement scheme and sequence are not limited to this example.

With reference to FIG. 4B, with the inner pipe 20, the outer pipe 30, and the first spacer 40 being concentrically placed with reference to the center line CL, the dimension of the outer circumferential surface 22 of the inner pipe 20 and that of the inner circumferential surface 31 of the outer pipe 30 both in the radial direction will be referred to as a dimension L1. The dimension L1 is larger than a thickness T1 of the first spacer 40 (L1>T1). The second spacer 50 also employs the same structure as that of the first spacer 40. The description for the dimension of the second spacer 50 will be omitted.

Figure 5B:
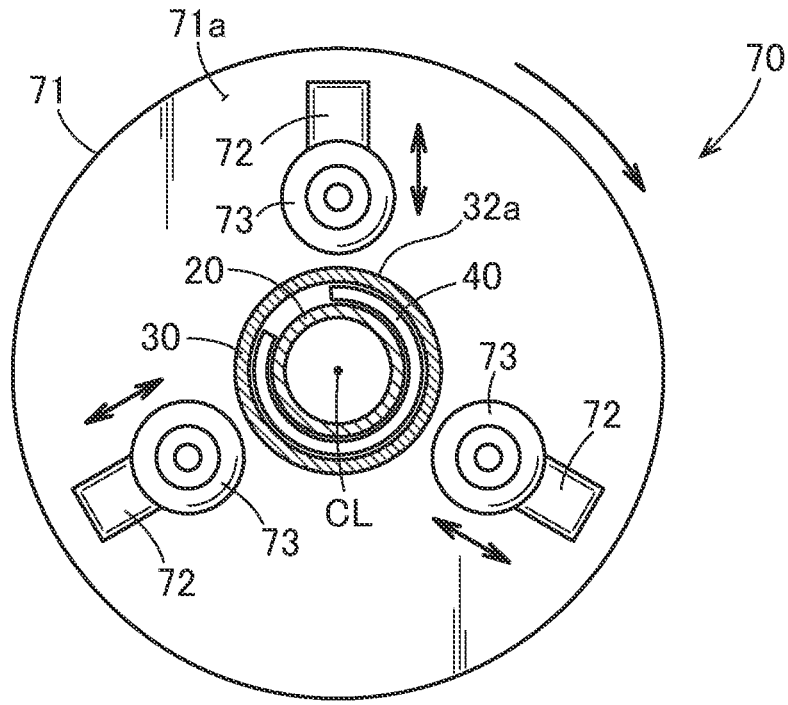
FIG. 5B is a cross-sectional view taken along a line 5B-5B in FIG. 5A.

With reference to FIG. 5A and FIG. 5B, next, a part of the outer pipe 30 is subjected to plastic deformation so as to reduce the diameter of the part of the outer pipe 30, and the first spacer 40 is press-fitted by the inner circumferential surface 31 of the outer pipe 30 and by the outer circumferential surface 22 of the inner pipe 20 (a press-fitting step). More specifically, one end 30a of the outer pipe 30 is fastened to a clamp 18, and a surface 32a in the outer circumferential surface 32 of the outer pipe 30 outwardly in the radial direction relative to the first spacer 40 is rolled by a rolling machine 70.

The rolling machine 70 includes an annular turning unit 71 rotatable around the center line CL, a plurality of (e.g., three) movable units 72 which is provided on one end surface 71a of the turning unit 71, and which is movable in the radial direction, and cylindrical rolling units 73 supported by the respective movable units 72.

When the movable units 72 move inwardly in the radial direction, the respective rolling units 73 become able to press the respective outer circumferential surfaces against a processing object. Moreover, when the turning unit 71 turns, the rolling units 73 become able to roll over the outer circumferential surface 32a of the outer pipe 30.

With reference to FIG. 6A, by the above-described two actions, a part of the outer pipe 30 subjected to the rolling has the outer circumferential surface and the inner circumferential surface having undergone the diameter reduction, and thus the first diameter-reduced portion 33 is formed.

Next, like the press-fitting of the first spacer 40, a surface 32b in the outer circumferential surface 32 of the outer pipe 30 outwardly in the radial direction relative to the second spacer 50 is rolled (the press-fitting step). The press-fitting sequence of the first spacer 40 and the second spacer 50 may be changed as appropriate. Moreover, the placing step and the press-fitting step may be repeated for each spacer. A part of the outer pipe 30 having undergone rolling has the outer circumferential surface and the inner circumferential surface subjected to the diameter reduction, and thus each second diameter-reduced portion 36 is formed.

With reference to FIG. 6B, after the second diameter-reduced portions 36 are formed, the first general portions 34 and 34, the second general portions 35 and 35, the first spaces 11, and the second spaces 12 are relatively formed in the outer pipe 30. Through the above-described press-fitting step, the double pipe 10 is thus obtained.

Next, advantageous effects of the first embodiment will be described.

With reference to FIG. 2A, the first spacer 40 is fastened in the double pipe 10 by being press-fitted by the inner circumferential surface 31 of the outer pipe 30 and by the outer circumferential surface 22 of the inner pipe 20. That is, a design such that when the inner pipe 20 and the first spacer 40 are placed relative to the outer pipe 30, the first spacer 40 abuts the outer circumferential surface 22 of the inner pipe 20, and also abuts the inner circumferential surface 31 of the outer pipe 30 is unnecessary.

With reference to FIGS. 4A and 4B, specifically, in the placing step, the dimension L1 between the inner circumferential surface 31 of the outer pipe 30 and the outer circumferential surface 22 of the inner pipe 20 in the radial direction is greater than the thickness T1 of the first spacer 40 (L1>T1). In the case of joining by, for example, brazing, it is desirable that the dimension L1 and the thickness T1 should be equal, and a high dimensional precision is required. Conversely, in the case of press-fitting, a clearance is permitted between the components, and a high dimensional precision is not required in the radial direction. This can reduce the manufacturing costs of the double pipe 10. This advantageous effect is common to second embodiment to fifth embodiment to be described later.

With reference to FIG. 2A, FIG. 5A, and FIG. 5B, as described above, the first spacer 40 is press-fitted by the inner circumferential surface 31 of the outer pipe 30 and the outer circumferential surface 22 of the inner pipe 20. Hence, with the first spacer 40 being press-fitted, the inner pipe 20, the outer pipe 30, and the first spacer 40 can be placed concentrically (the respective center lines CL of the components are aligned with each other). This can reduce the offset of the weight center of the double pipe 10.

With reference to FIG. 1 and FIG. 2A, the first spacer 40 is formed in a C-shape as viewed in the direction along the center line CL of the double pipe 10, and has the opening 41. The opening 41 serves as a communication passage that causes the annular first annular spaces 11 and 11 adjacent to each other through the first spacer 40 to be in communication with each other.

Similarly, the opening 51 of the second spacer 50 serves as a communication passage that causes the first space 11 and the second space 12 adjacent to each other through the second spacer 50 to be in communication with each other. Hence, the clearance between the inner pipe 20 and the outer pipe 30 can be a flow passage through which a second fluid different from the first fluid can flow.

In addition, by adjusting the respective positions of the spacers 40, 50 and 50 in the circumferential direction, the flow of the second fluid can be adjusted.

Second Embodiment

Figure 7B:
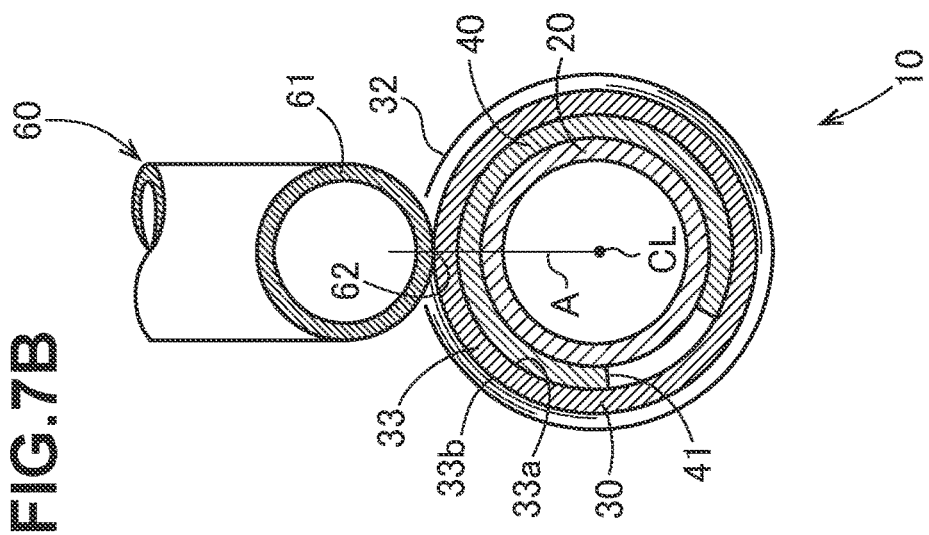
FIG. 7B is a cross-sectional view taken along a line 7B-7B in FIG. 7A.
Figure 7A:
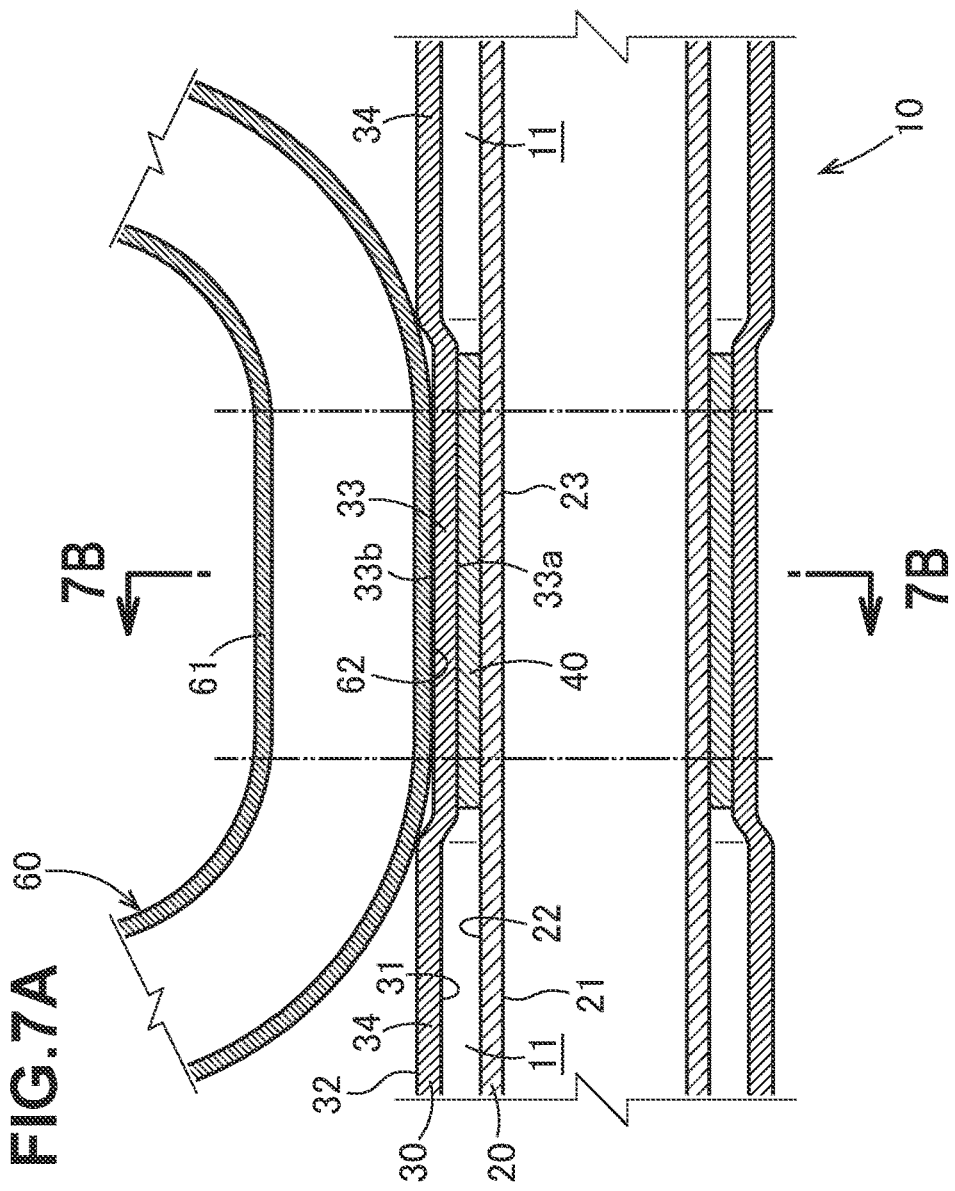
FIG. 7A is a cross-sectional view of a double pipe according to a second embodiment.

With reference to FIG. 7A, according to a second embodiment, a pipe 60 in which a third fluid (a fluid different from the first fluid and the second fluid that flow through the interior of the double pipe 10) can flow is attached to the double pipe 10 of the first embodiment. The pipe 60 includes a linear straight pipe portion 61 (an abutting portion) extended along the center line CL. The straight pipe portion 61 includes an abutting surface 62 that abuts the outer circumferential surface 32 of the outer pipe 30. Hence, when the heated third fluid is caused to flow in the pipe 60, the inner pipe 20 can be heated by heat transfer through the outer pipe 30 and through the first spacer 40.

In particular, according to the second embodiment, the abutting surface 62 of the pipe 60 abuts the outer circumferential surface 33a of the first diameter-reduced portion 33 of the outer pipe 30 (the external side in the radial direction of the part of the outer pipe 30 where the spacer 40 is press-fitted in the lengthwise direction). In comparison with a case in which the abutting surface 62 abuts the first general portion 34, the inner pipe 20 can be heated efficiently.

With reference to FIG. 7B, as viewed in the direction along the center line CL, a straight line that passes through the center line CL and the abutting surface 62 of the pipe 60 will be defined as a reference line A. The reference line A and a part of the first spacer 40 overlap with each other. Hence, the inner pipe 20 can be further efficiently heated.

Note that the opening 41 of the first spacer 40 may be located on the reference line A (a state in which the first spacer 40 and the reference line A do not overlap with each other). That is, when the position of the opening 41 of the first spacer 40 is changed in the circumferential direction, adjustment of the heat transfer performance to the inner pipe 20 is enabled.

Furthermore, including the pipe 60 in the embodiments to be described later, a cooled fluid may be caused to flow through the pipe 60.

Figure 8:
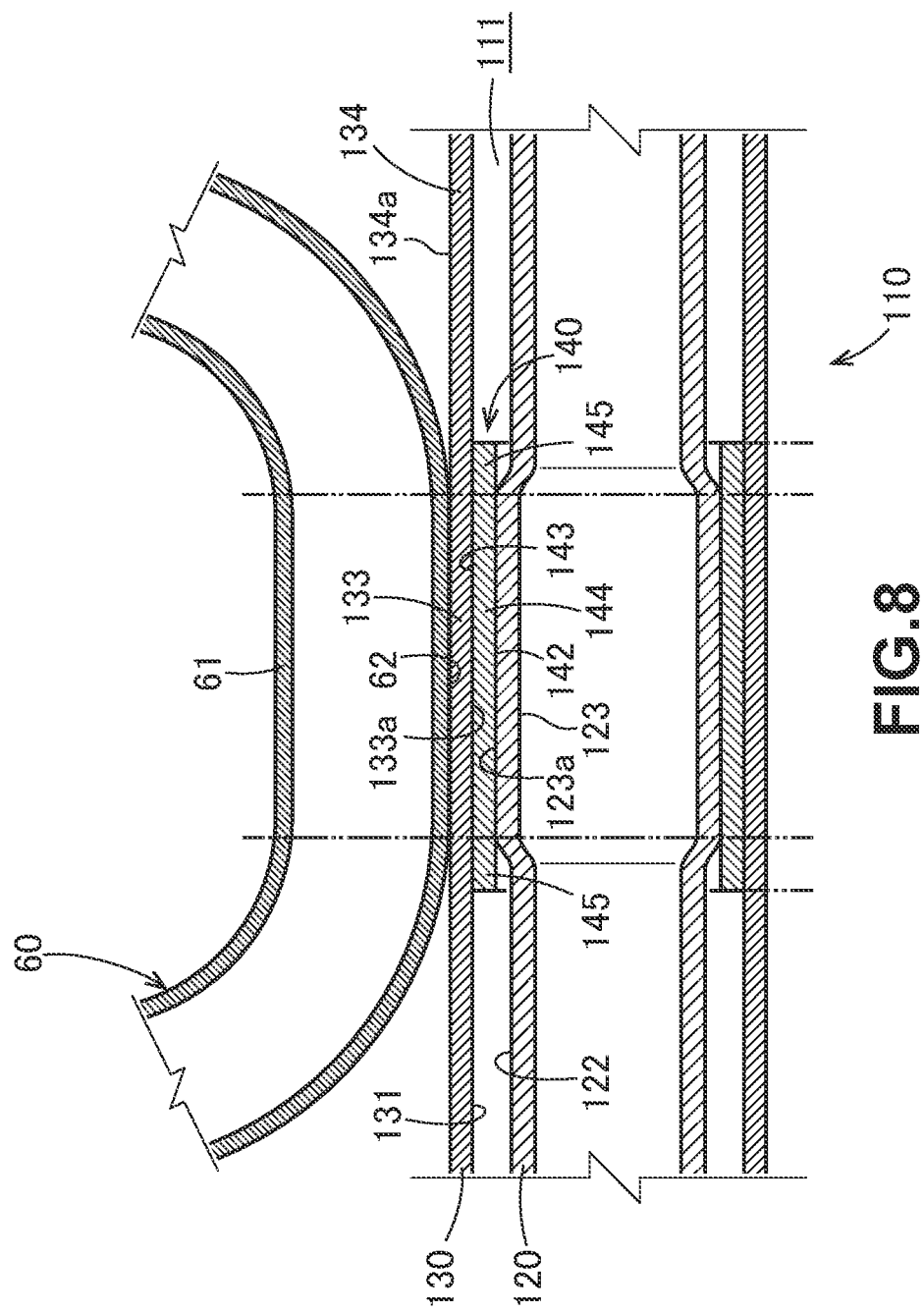
FIG. 8 is a cross-sectional view of a double pipe according to a modified example of the second embodiment.

A modified example of the second embodiment will be described. With reference to FIG. 8, according to a double pipe 110 of the modified example of the second embodiment, by causing a part of an inner pipe 120 so as to increase the diameter by plastic deformation, a first spacer 140 is press-fitted by an inner circumferential surface 131 of an outer pipe 130 and an outer circumferential surface 122 of the inner pipe 120. The description for conventional technologies to increase the diameter of the inner pipe 120 will be omitted.

The inner pipe 120 includes a first diameter-increased portion 123 that has an increased diameter by plasticity processing. An outer circumferential surface 123a of the first diameter-increased portion 123 is present across the entire circumference other than an opening of the first spacer 140, and presses an inner circumferential surface 142 of the first spacer 140 outwardly in the radial direction.

The outer pipe 130 includes a first support portion 133 which abuts an outer circumferential surface 143 of the first spacer 140, and which supports the first spacer 140 pressed by the first diameter-increased portion 123 outwardly in the radial direction.

The first support portion 133 compresses the first spacer 140 in the radial direction together with the first diameter-increased portion 123. Moreover, the outer pipe 130 includes a first outer wall portion 134 at the outer-circumference side of a first space 111.

The first spacer 140 includes a press-fitted portion 144 that is press-fitted by the first diameter-increased portion 123 and by the first support portion 133, and extended portions 145 and 145 which are not press-fitted, and which are extended in the lengthwise direction of the first spacer 140 from the respective ends of the press-fitted portion 144. That is, the spacer may employ a structure in which at least a part is press-fitted like the first spacer 140.

An abutting surface 62 of the pipe 60 is located outwardly in the radial direction relative to the first diameter-increased portion 123 (outwardly in the radial direction relative to the press-fitted portion 144, outwardly in the radial direction relative to the first support portion 133) in the lengthwise direction of the outer pipe 130. Note that a part of the abutting surface 62 of the pipe 60 may be located outwardly in the radial direction relative to the extended portions 145 and 145. In comparison with a case in which the abutting surface 62 abuts an outer circumferential surface 134*a* of the first outer wall portion 134, the inner pipe 120 can be heated efficiently.

Third Embodiment

With reference to FIG. 9A, in a double pipe 210 according to a third embodiment, an outer pipe 230 includes a first diameter-reduced portion 233 that has a reduced diameter by plasticity processing. The first diameter-reduced portion 233 includes a pressing portion 234 that presses a first spacer 240 inwardly in the radial direction, and non-pressing portions 235 and 235 which are located at respective ends of the pressing portion 234, and which do not press the first spacer 240. Although the non-pressing portions 235 and 235 are subjected to diameter-reduction, those do not contact the first spacer 240. Regarding the direction along the center line CL, a dimension L3 of the first spacer 240 is shorter than a dimension L4 of the first diameter-reduced portion 233 (L3<L4). Note that the dimension L3 may be equal to the dimension L4, or may be longer than the dimension L4 (L3≥L4).

An inner circumferential surface 234*a* of the pressing portion 234 is present across the entire circumference other than an opening 241 of the first spacer 240 (see FIG. 9B), and presses an outer circumferential surface 243 of the first spacer 240 inwardly in the radial direction.

An inner pipe 220 includes a first support portion 223 that supports the first spacer 240 pressed by the first diameter-reduced portion 233. An outer circumferential surface 223*a* of the first support portion 223 abuts an inner circumferential surface 244 of the first spacer 240, and compresses the first spacer 240 in the radial direction together with the first diameter-reduced portion 233.

A pipe 250 abuts the first diameter-reduced portion 233 in the circumferential direction. The pipe 250 is located outwardly in the lengthwise direction of an outer pipe 230 relative to the pressing portion 234. A dimension L3 of the first spacer 240 is equal to a dimension of an outer diameter D of the pipe 250 (L3=D). Note that the dimension L3 may be larger than the outer diameter D (L3>D) or may be smaller than the outer diameter D (L3<D).

With reference to FIG. 9B, the pipe 250 includes a curved portion 251 (an abutting portion) that is curved in a circular arc shape around the center line CL. The curved portion 251 includes an abutting surface 252 that abuts an outer circumferential surface 232 of the outer pipe 230. A straight line that passes through an arbitrary portion of the abutting surface 252 and the center of the double pipe 210 will be defined as a reference line B. A part of the first spacer 240 overlaps the reference line B. Hence, the pipe 250 can efficiently heat the inner pipe 220.

Note that the opening 241 of the first spacer 240 may be located on the reference line B. That is, when the position of the opening 241 of the first spacer 240 is changed in the circumferential direction, adjustment of the heat transfer performance from the pipe 250 to the inner pipe 220 can be accomplished.

Fourth Embodiment

Figure 10A:
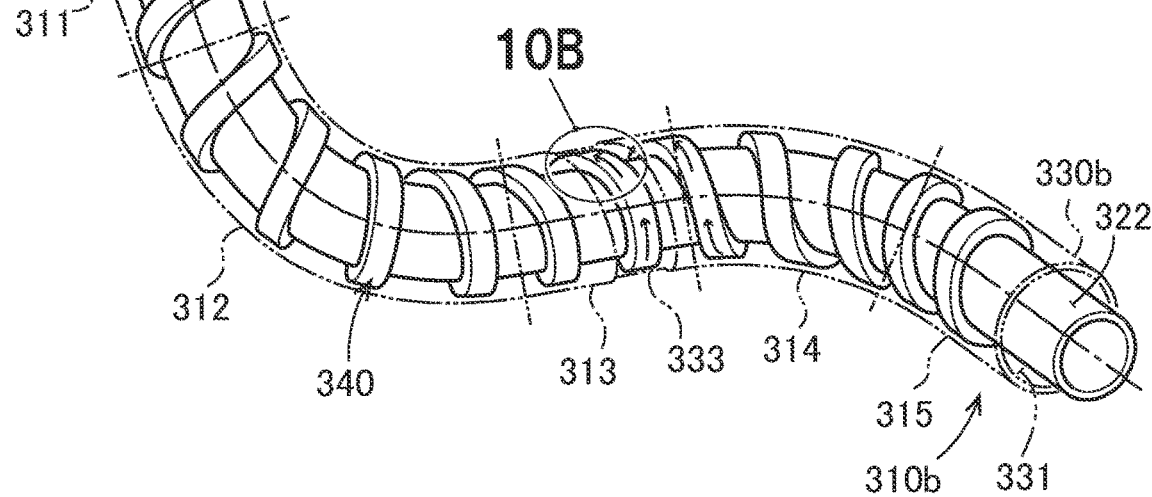
FIG. 10A is a perspective view of a double pipe according to a fourth embodiment.

With reference to FIG. 10A, as for a double pipe 310, some portions of the double pipe 310 itself are bent. In the double pipe 310, portions that extend linearly will be referred to as straight pipe portions 311, 313 and 315, and portions bent by bending will be referred to as bent portions 312 and 314.

More specifically, the double pipe 310 includes the first straight pipe portion 311 at one-end-310*a* side, the first bent portion 312 adjacent to the first straight pipe portion 311, the second straight pipe portion 313 adjacent to the first bent portion 312, the second bent portion 314 adjacent to the second straight pipe portion 313, and the third straight pipe portion 315 adjacent to the second bent portion 314 and located at the other-end-310*b* side. Note that the double pipe 310 may be bent entirely (i.e., a shape without a straight pipe portion).

A spacer 340 provided between an inner pipe 320 and an outer pipe 330 is a single component continuously provided to the other end 310*b* of the double pipe 310 from the one end 310*a* thereof. The spacer 340 is formed in a spiral shape wound around an outer circumferential surface 322 of the inner pipe 320.

Figure 10B:
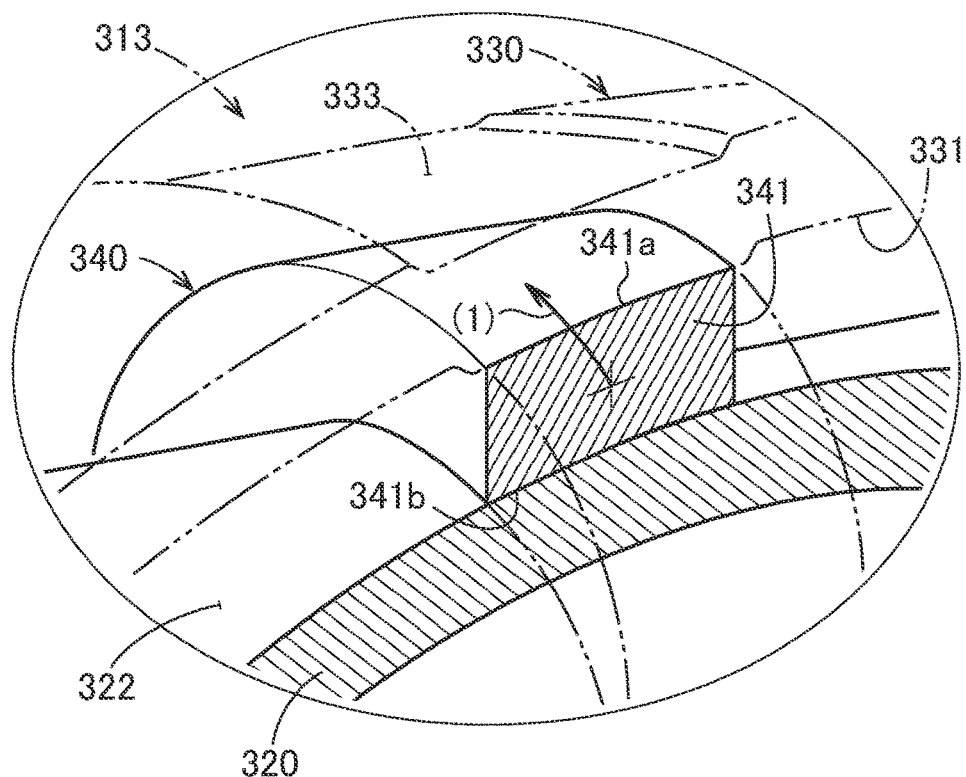
FIG. 10B is an enlarged diagram of a portion 10B in FIG. 10A.

With reference to FIG. 10B, the spacer 340 is press-fitted by the outer circumferential surface 322 of the inner pipe 320 and an inner circumferential surface 331 of an outer pipe 330 at the second straight pipe portion 313. As viewed in the winding direction of the spacer 340 (see an arrow (1)), the cross section of the spacer 340 is formed in a rectangular shape. An outer long side 341*a* of the rectangle abuts the inner circumferential surface 331 of the outer pipe 330. An inner long side 341*b* of the rectangle abuts the outer circumferential surface 322 of the inner pipe 320.

A method for manufacturing the double pipe 310 will be described.

Figure 11A:
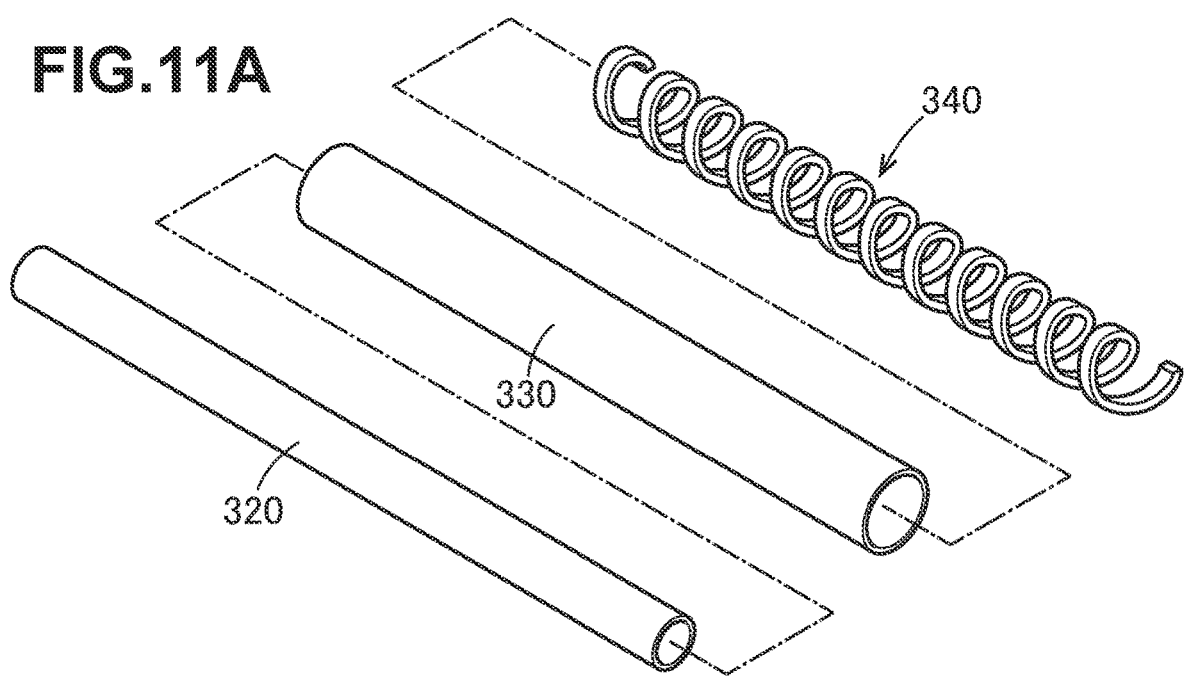
FIG. 11A is a diagram illustrating a preparing step of a method for manufacturing the double pipe illustrated in FIG. 10A.
Figure 11B:
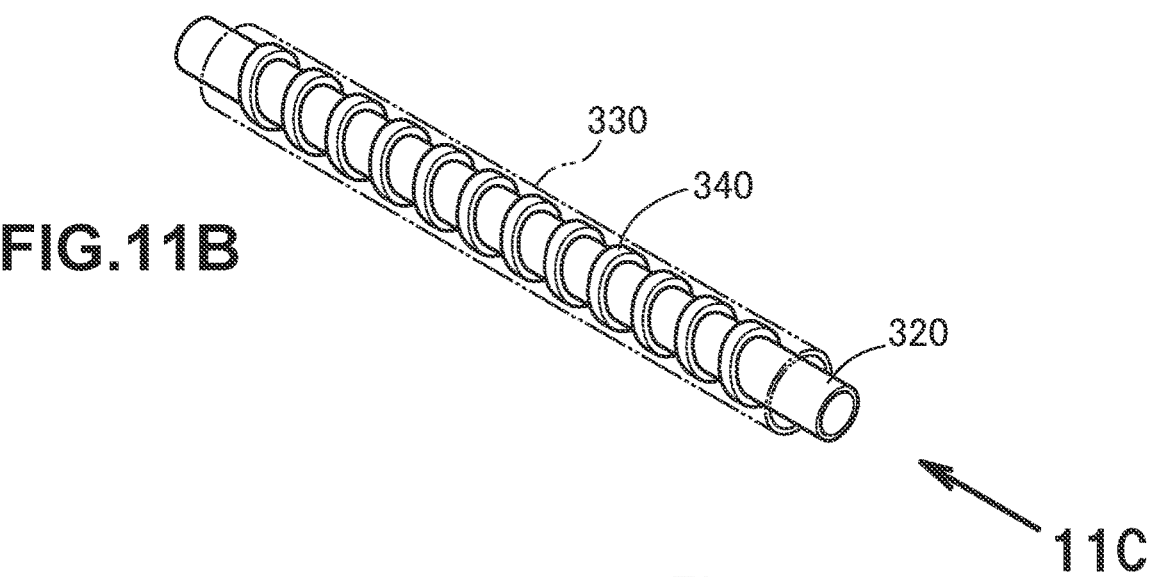
FIG. 11B is a diagram illustrating a placing step of the method for manufacturing the double pipe illustrated in FIG. 10A.
Figure 11C:
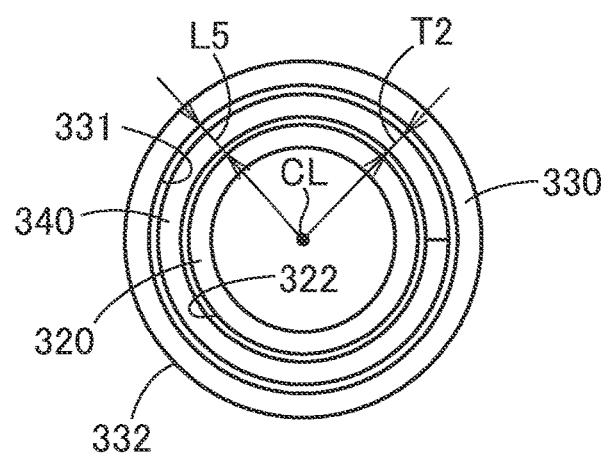
FIG. 11C is a diagram as viewed along an arrow 11C in FIG. 11B.

With reference to FIG. 11A, first, the inner pipe 320, the outer pipe 330 in which the inner pipe 320 can be placed, and the spiral spacer 340 that maintains the clearance between the inner pipe 320 and the outer pipe 330 are prepared (a preparing step).

Next, the inner pipe 320 and the spacer 340 are placed relative to the outer pipe 330 (a placing step). For example, the spiral spacer 340 is attached to the inner pipe 320 so as to be wound therearound, and the inner pipe 320 around which the spacer 340 is wound is inserted in the outer pipe 330. However, how to place the component is not limited to this example.

Around the center line CL, with the inner pipe 320, the outer pipe 330, and the spacer 340 being placed concentrically, a dimension between the outer circumferential surface 322 of the inner pipe 320 and the inner circumferential surface 331 of the outer pipe 330 in the radial direction will be defined as a dimension L5. The dimension L5 is greater than a thickness T2 of the spacer 340 (L5>T2).

With reference to FIG. 12A and FIG. 12B, next, by a processing machine 350, a part of the outer pipe 330 is subjected to plastic deformation so as to reduce the diameter, thereby press-fitting the spacer 340 by the inner circumferential surface 331 of the outer pipe 330 and by the outer circumferential surface 322 of the inner pipe 320 (a press-fitting step).

The processing machine 350 has a plurality of dies 351 which is placed in the circumferential direction so as to surround the outer circumferential surface 332 of the outer pipe 330, and which is movable in the radial direction. A tip end surface 352 of each die 351 located inwardly in the radial direction can depress the outer circumferential surface 332 of the outer pipe 330. When the respective dies 351 simultaneously depress the outer circumferential surface 332 of the outer pipe 330, the outer pipe 330 is subjected to diameter reduction. The spacer 340 is press-fitted by the inner circumferential surface 331 of the outer pipe 330 and by the outer circumferential surface 322 of the inner pipe 320.

Note that, as described above, the spacer 340 is placed from the one end 310a of the double pipe 310 to the other end 310b thereof. This enables press-fitting at an arbitrary location in the outer pipe 330.

With reference to FIG. 12C, eventually, the double pipe 310 that has bent portions 312, 314 is obtained by performing bending (a bending step) to the outer pipe 330 that has a diameter-reduced portion 333 formed through the press-fitting step.

As described above, the spacer 340 provided between the inner pipe 320 and the outer pipe 330 is formed in a spiral shape. When the spacer 340 is bent, the adjacent portions with each other become close to each other. In the bending step, bending is thus facilitated. The spacer 340 is suitable for the double pipe 310 that has bent portions.

With reference to FIG. 10B, as viewed along the winding direction of the spacer 340, the cross section of the spacer 340 is formed in a rectangular shape. In comparison with a spacer having a circular cross section (a coil-shape spacer), a contact area of the spacer 340 to the inner circumferential surface 331 of the outer pipe 330 and to the outer circumferential surface 322 of the inner pipe 320 increases. Forces produced at portions contacting with each other in the press-fitting step are distributed, suppressing a deformation of the inner pipe 320 and of the outer pipe 330. Note that respective materials and thicknesses of the outer pipe 330, the inner pipe 320, and the spacer 340 can be changed as appropriate and combined. This enables an adjustment of the deformation level of each component.

Fifth Embodiment

FIG. 13A illustrates components that form a double pipe 400 of a fifth embodiment. The same structure as that of the double pipe 10 of the first embodiment will be denoted by the same reference numeral, and the detailed description thereof will be omitted. The double pipe includes an inner pipe 20, an outer pipe 30, a first spacer 40A, and second spacers 50A and 50A.

Figure 14B:
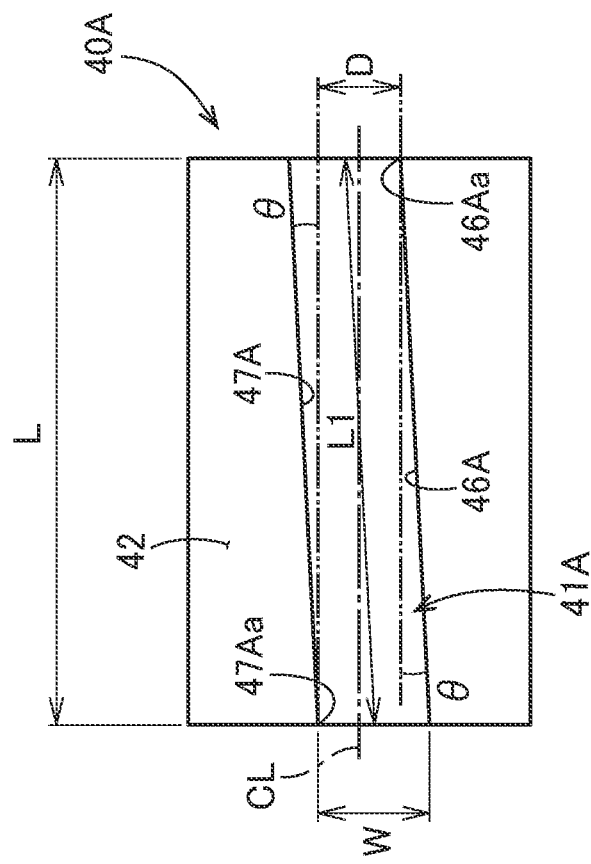
FIG. 14B is a diagram for describing an opening of the spacer according to the fifth embodiment.
Figure 14A:
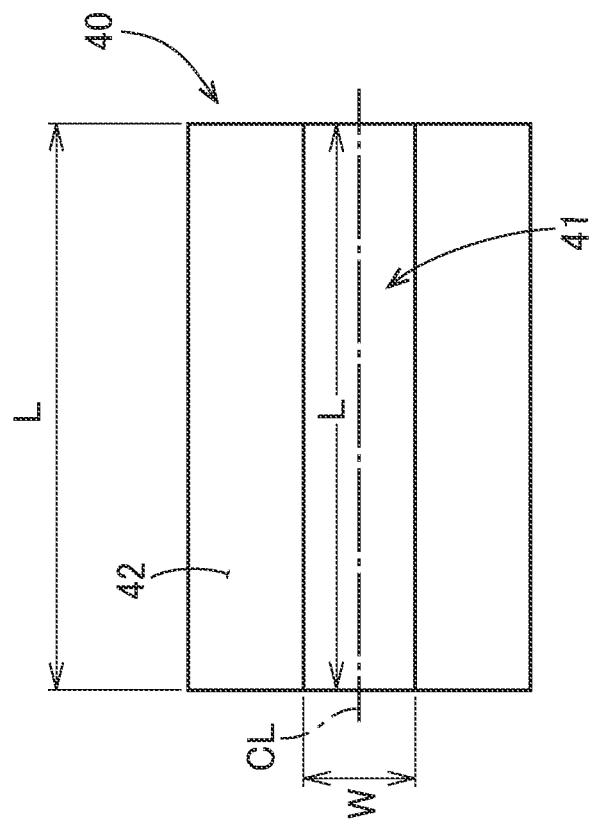
FIG. 14A is a diagram for describing an opening of the spacer according to the first embodiment.

FIG. 14A illustrates the first spacer 40 of the first embodiment. The length of the first spacer 40 is a length L. The length of the opening 41 is also the length L. A width of the opening 41 is a width W. The opening 41 extends along the center line CL. That is, the width W of the opening 41 is constant to the other end of the first spacer 40 from the one end thereof in the lengthwise direction.

With reference to FIG. 13B and FIG. 14B, the first spacer 40A of the fifth embodiment is substantially cylindrical as a whole, and has a slit-shape opening 41A so as to be in a C-shape as viewed in the direction along the center line CL. The opening 41 is inclined relative to the center line CL.

Regarding the first spacer 40A, the length of the first spacer 40A is the length L. The width of the opening 41A is the width W. The length of the opening 41A is a length L1.

The opening 41A includes a first surface 46A and a second surface 47A that face with each other. An angle of the first surface 46A and an angle of the second surface 47A both relative to the center line CL are an inclination angle θ.

In both ends of the first surface 46A in the lengthwise direction, the end near the center line CL will be referred to as a first end 46Aa. In both ends of the second surface 47A in the lengthwise direction, the end near the center line CL will be referred to as a second end 47Aa.

Regarding a dimension with reference to the same direction as that of the width W of the opening 41A, the clearance between the first end 46Aa and the second end 47Aa will be defined as a clearance D. The clearance D is shorter than the width W of the opening 41 of the first spacer 40 of the first embodiment (D<W). Note that the length L1 of the opening 41 of the first spacer 40A of the fifth embodiment is longer than the length L of the opening 41 of the first spacer 40 of the first embodiment (L1>L).

Advantageous effects of the fifth embodiment will be described.

With reference to FIG. 15A, in the first embodiment, the width of the tip end surface 352 (a depressing surface) of the die 351 of the processing machine 350 will be defined as a width M. When the width W of the opening 41 is wider than the width M of the tip end surface 352 (the depressing surface) of the die 351 (M<W), in the radial direction (the depressing direction), the tip end surface 352 of the die 351 may not overlap the first spacer 40. When plasticity processing is performed, a portion of the outer pipe 30 located outwardly in the radial direction relative to the opening 41 of the first spacer 40 is likely to be deformed locally.

With reference to FIG. 14B and FIG. 15B, according to the fifth embodiment, the opening 41A of the first spacer 40A is inclined relative to the center line CL. Like the first spacer 40 of the first embodiment, although the width of the opening 41A of the first spacer 40A of the fifth embodiment is the width W, the clearance D between the first end 46Aa and the second end 47Aa is shorter than the width W (D<W). The tip end surface 352 of the die 351 is likely to overlap at least either one of a portion 48A around the first end 46Aa of the first spacer 40A or a portion 49A around the second end 47Aa of the first spacer 40A in the radial direction (the depressing direction).

The shape of the inner circumferential surface of the double pipe 400 and that of the outer circumferential surface thereof after press-fit are stabilized. Consequently, the fitting with the other component and the assembling precision improve, and thus it becomes possible for the double pipe to cope with a joining that requires a high dimensional precision like blazing.

Figure 16:
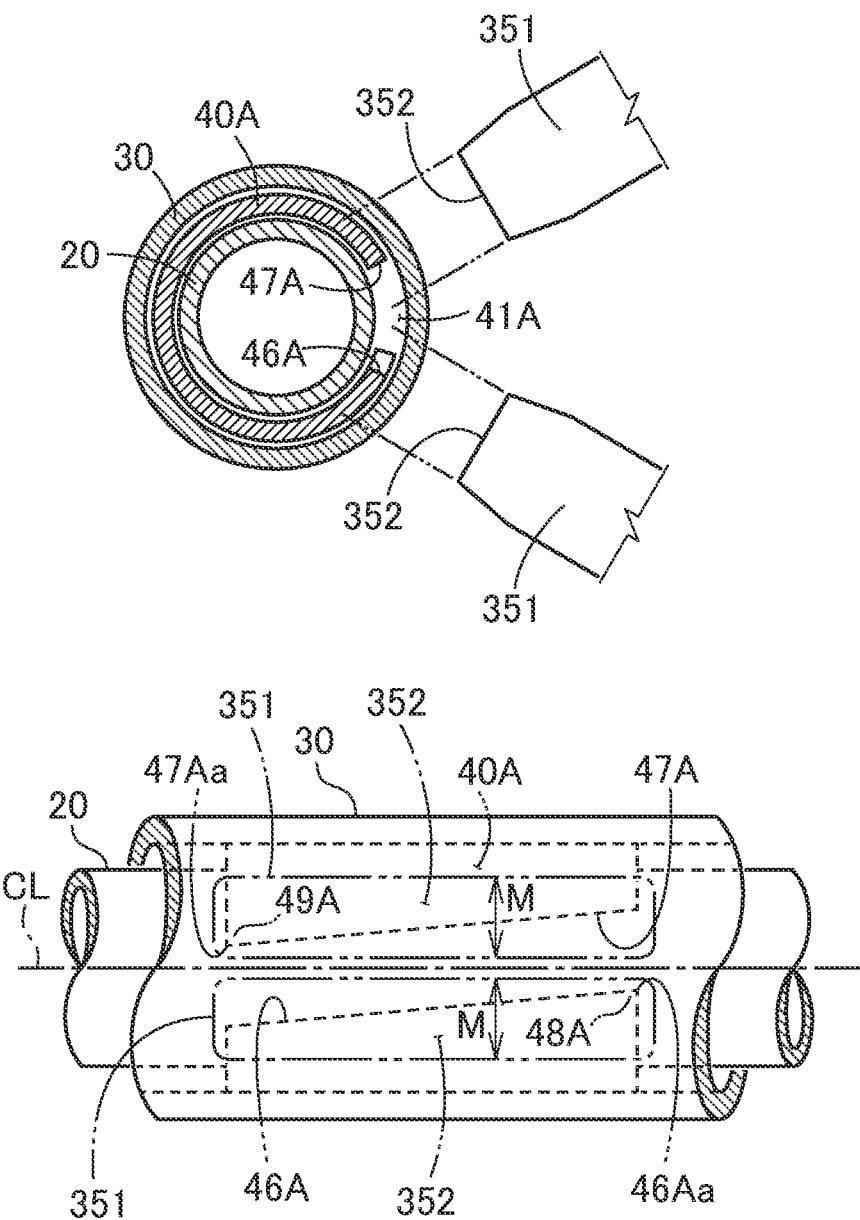
FIG. 16 is a diagram for describing a method for manufacturing the double pipe when two dies are located relative to the opening of the spacer.
Figure 17:
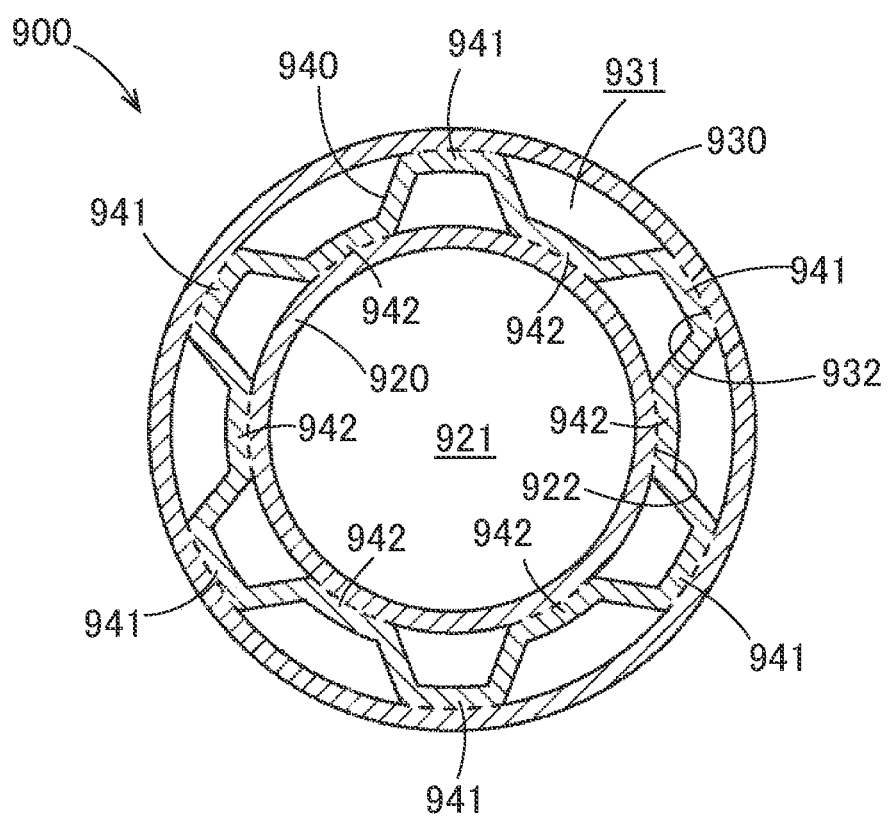
FIG. 17 is a cross-sectional view of a double pipe according to a conventional technology.

Note that, in FIG. 15B, the tip end surface 352 of the one die 351 among the plurality of dies 351 overlaps both the portion 48A near the first end 46Aa and the portion 49A near the second end 47Aa, as illustrated in FIG. 16, in the dies 351 and 351 adjacent to each other in the circumferential direction, the tip end surface 352 of the one die 351 may overlap the portion 48A near the first end 46Aa, and the tip end surface 352 of the other die 351 may overlap the portion 49A near the second end 47Aa at the time of press-fitting.

Moreover, the width W of the opening 41A of the first spacer 40A may be smaller than the width M of the die. This surely enables the respective dies and the portions 48A and 49A of the first spacer 40A to overlap with each other in the radial direction.

The above description will be summarized. According to the first spacer 40A of the fifth embodiment, the clearance D is shorter than the width W of the opening. Hence, in comparison with the first spacer 40 of the first embodiment, the die is likely to overlap the first spacer 40A regardless of the type of the die.

Note that the width W and the inclination angle θ of the opening 41 can be changed as appropriate. When, in particular, the inclination angle θ is increased, the distance D becomes small. The inclination angle θ may be designed in such a way that the distance D becomes "0". Moreover, the inclination angle θ may be designed in such a way that the distance D becomes a negative value.

The description for the structure of the first spacer 40A is also true for an opening 51A of the second spacer 50A (see FIG. 13A). Moreover, the first spacer 40A accomplishes the same advantageous effects when plasticity processing to increase the diameter of the inner pipe 20 is performed. Furthermore, the first spacer 40A may be applied to the second embodiment (FIG. 7 and FIG. 8) and to the third embodiment (FIG. 9).

Note that the components the double pipe, those of the pipes, and the method for manufacturing the double pipe in the respective embodiments may be combined as appropriate.

What is claimed is:

1. A double pipe comprising:
   an outer pipe in which an inner pipe is placed;
   a spacer that maintains a clearance between the inner pipe and the outer pipe; and
   a pipe through which a fluid is capable of flowing,
   wherein at least a part of the spacer is press-fitted by an inner circumferential surface of the outer pipe and by an outer circumferential surface of the inner pipe, and
   wherein the pipe comprises an abutting surface that abuts an outer circumferential surface of the outer pipe.

2. The double pipe according to claim 1, wherein the abutting surface of the pipe is located, in a lengthwise direction of the outer pipe, outwardly in a radial direction relative to the spacer.

3. The double pipe according to claim 2, wherein the abutting surface of the pipe is located, in the lengthwise direction of the outer pipe, outwardly in the radial direction relative to the press-fitted portion of the spacer.

4. The double pipe according to claim 1, wherein the spacer is formed in a substantially cylindrical shape as a whole, and has a slit-shape opening so as to be in a C-shape as viewed in a direction along a center line of the double pipe.

5. The double pipe according to claim 4, wherein the opening of the spacer is inclined relative to the center line of the double pipe.

6. The double pipe according to claim 4, wherein when a straight line that passes through the center line of the double pipe and the abutting surface of the pipe as viewed in the direction along the center line of the double pipe is defined as a reference line, a part of the spacer overlaps the reference line.

7. The double pipe according to claim 5, wherein when a straight line that passes through the center line of the double pipe and the abutting surface of the pipe as viewed in the direction along the center line of the double pipe is defined as a reference line, a part of the spacer overlaps the reference line.

8. A double pipe comprising an outer pipe in which an inner pipe is placed, and a spacer that maintains a clearance between the inner pipe and the outer pipe, wherein:
   at least a part of the spacer is press-fitted by an inner circumferential surface of the outer pipe and by an outer circumferential surface of the inner pipe;
   the double pipe comprises a bent portion that is at least a part of the double pipe itself; and
   the spacer placed at the bent portion is formed in a spiral shape wound around the outer circumferential surface of the inner pipe in the bent portion.

9. The double pipe according to claim 8, wherein a cross section of the spacer is formed in a rectangular shape as viewed in a winding direction of the spacer.

10. The double pipe according to claim 2, wherein the spacer is formed in a substantially cylindrical shape as a whole, and has a slit-shape opening so as to be in a C-shape as viewed in a direction along a center line of the double pipe.

11. The double pipe according to claim 10, wherein the opening of the spacer is inclined relative to the center line of the double pipe.

12. The double pipe according to claim 10, wherein when a straight line that passes through the center line of the double pipe and the abutting surface of the pipe as viewed in the direction along the center line of the double pipe is defined as a reference line, a part of the spacer overlaps the reference line.

13. The double pipe according to claim 11, wherein when a straight line that passes through the center line of the double pipe and the abutting surface of the pipe as viewed in the direction along the center line of the double pipe is defined as a reference line, a part of the spacer overlaps the reference line.

14. The double pipe according to claim 3, wherein the spacer is formed in a substantially cylindrical shape as a whole, and has a slit-shape opening so as to be in a C-shape as viewed in a direction along a center line of the double pipe.

15. The double pipe according to claim 14, wherein the opening of the spacer is inclined relative to the center line of the double pipe.

16. The double pipe according to claim 14, wherein when a straight line that passes through the center line of the double pipe and the abutting surface of the pipe as viewed in the direction along the center line of the double pipe is defined as a reference line, a part of the spacer overlaps the reference line.

* * * * *